(12) United States Patent
Tanaka

(10) Patent No.: US 6,509,845 B1
(45) Date of Patent: Jan. 21, 2003

(54) WIRELESS INPUT APPARATUS

(75) Inventor: Hiroshi Tanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/488,553

(22) Filed: Jan. 21, 2000

(30) Foreign Application Priority Data

Mar. 8, 1999 (JP) .......................................... 11-060835

(51) Int. Cl.$^7$ ............................................. H03M 11/00
(52) U.S. Cl. ........................ 341/22; 341/126; 345/168
(58) Field of Search ........................ 341/22, 126, 142, 341/176; 345/168; 455/151.2

(56) References Cited

U.S. PATENT DOCUMENTS

| | | | | |
|---|---|---|---|---|
| 5,870,033 A | * | 2/1999 | Strolo | 341/176 |
| 5,955,975 A | * | 9/1999 | Frederick et al. | 341/22 |
| 6,031,470 A | * | 2/2000 | Asari et al. | 341/126 |

FOREIGN PATENT DOCUMENTS

| | | |
|---|---|---|
| JP | 60181910 | 9/1985 |
| JP | 5066873 | 3/1993 |
| JP | A5134792 | 6/1993 |
| JP | 5265625 | 10/1993 |
| JP | 7023472 | 1/1995 |
| JP | 10136475 | 5/1998 |

* cited by examiner

*Primary Examiner*—Michael Horabik
*Assistant Examiner*—Albert K. Wong
(74) *Attorney, Agent, or Firm*—Birch, Stewart, Kolasch & Birch, LLP

(57) ABSTRACT

An object of the invention is to provide a wireless input apparatus capable of recognizing the end of an operation with reliability even when any trouble occurs in a wireless communication channel. When an operation of pressing a key of a wireless keyboard is carried out, the operation is detected by a key press detecting section, and a key press signal is transmitted from an infrared rays emitting section with a medium of infrared rays. When the key is kept pressed, the key press signal is transmitted at intervals of a time detected by a time detecting section. The signal received by an infrared rays receiving section of a processing unit is detected by a signal detecting section, and a timer for a threshold time is restarted by a time detecting section. The threshold time is set so as to be longer than the interval of signal reception. When the signal transmitted with the medium of infrared rays is interrupted, a release signal is issued by a key release signal issuing section, whereby a control section recognizes that the operation of pressing the key is ended.

10 Claims, 28 Drawing Sheets

WIRELESS INPUT APPARATUS

BACKGROUND OF THE INVENTION

1. Field of the Invention

The present invention relates to a wireless input apparatus which performs input of data and information by wireless.

2. Description of the Related Art

Hitherto, as a data entry device for inputting data and information to various types of computer apparatuses, many types of input devices have been used, such as a key board, a mouse, a trackball, a game pad, a joystick, a tablet, or a touch panel. For example, in the case of a portable information processing apparatus, a data entry unit as mentioned above is sometimes fixed directly to a housing of the apparatus. However, it is usual that such a data entry unit is formed separately from a housing of a computer apparatus.

A keyboard will be taken as an example for explanation. A keyboard is paired with a main unit of an apparatus serving as a host to which the keyboard is connected so as to work. In general, codes outputted by the keyboard can be divided into two types: a code when a key is pressed, which is a code called to be a press code; and a code when a key is released, which is a code called to be a release code. When a key is pressed, a press code of the key is transmitted to the main unit of the apparatus, and when the key is released, a release code of the key is transmitted. The main unit of the apparatus measures time from reception of the press code of the key to reception of the release code of the key, judges that the key is kept pressed in the case where the time is equal to or more than a predetermined time, and may judge that the key was continuously hit plural times to perform a repeat operation of the key. By designing in this way, the operator of a key does not need to conduct an operation of pressing and releasing the key repeatedly, and can conduct typing plural times automatically by keeping the key pressed for a predetermined time or more, with the result that convenience is increased. For example, when a key "A" is kept pressed for 500 ms or more, typing the key "A" is automatically repeated at every 100 ms, and the result of input is "AAA . . ." However, the main unit of the apparatus works as in the case of a key being hit continuously even when the main unit of the apparatus does not receive a release code of the key after receiving a press code of the key.

A prior art apparatus which relates to prevention of such a wrong repeat operation of a keyboard is disclosed in Japanese Unexamined Patent Publication JP-A5-134792 (1993), for example. According to this prior art apparatus, even when a wired keyboard fails in detection of an end of pressing a key, in the case where no key is pressed, the keyboard transmits information representing such status to a main unit of an apparatus, so that a wrong repeat operation can be prevented. Thus, even when the keyboard fails in detection of a point in time when a key is released, in the case where the keyboard can detect at least a status that no key is pressed, a key repeat operation would not be performed. In the case where a release code does not reach the main unit of the apparatus although the release code is transmitted from the keyboard, a wrong repeat operation might be started. However, in the case of a wired keyboard, transmission of data transmitted from the keyboard would not be interrupted as long as an electrical connection is physically formed.

FIG. 28 schematically shows an electrical configuration of a wireless keyboard 1 which is capable of performing data transmission by wireless. The wireless keyboard 1 does not need to be connected by a wire because data transmission is performed by wireless communication between the keyboard and a main body of an apparatus, so that various kinds of problems due to the wire for connection can be avoided. For example, in the case of a wired keyboard, the keyboard cannot be moved away from a main unit of an apparatus in excess of a length of a wire connected between the main unit of the apparatus and the keyboard, and the wire between the main unit of the apparatus and the keyboard might become a nuisance.

In the wireless keyboard 1 as shown in FIG. 28, a key press operation of a keyboard 2 is detected by key press detecting means 3. In order to detect no key being pressed as in the case of JP-A 5-134792 mentioned above, the wireless keyboard 1 is provided with no key press detecting means 4. A signal which represents a result of detection by the key press detecting means 3 or the no key press detecting means is transmitted from transmitting means 5 to the main unit of the apparatus by wireless with infrared rays or the like used as a medium.

FIGS. 29(*a*)–29(*e*) show signals which are generated in accordance with a key input operation in the wireless keyboard 1 as shown in FIG. 28. At an instant when a key is pressed and at an instant when pressing the key is ended as described in FIG. 29(*a*), a key press and a key release as shown in FIG. 29(*b*) occur, which are recognized as shown in FIG. 29(*c*) by the host. However, there is a case where a wireless communication channel is interrupted during an operation as shown in FIG. 29(*d*). In this case, the host cannot recognize an end of the key pressing operation as shown in FIG. 29(*e*). However, it does not much matter in the case where only a key release signal reaches the host.

The wireless keyboard 1 as shown in FIG. 28 transmits information of a code associated with a key operation, to the main unit of the apparatus via the wireless communication channel. In the case of a wireless communication channel using light, radio waves or the like as a medium, there is a possibility that the communication channel is interrupted at anytime. When the communication channel is not interrupted, there is no problem because both a key press and a key release signal usually reach the main unit of the apparatus as a set. However, when the communication channel is interrupted, it may happen as shown in FIG. 29(*d*) that only a key press reaches the main unit of the apparatus and the key release signal expected to reach after the key press does not reach. In such a case, the main unit of the apparatus judges that the key is kept pressed and performs a key repeat process following a program operation, thereby continuing the key repeat process permanently. Although the no key press detecting means 4 is installed as shown in FIG. 28, when communication between the wireless keyboard 1 and the main unit of the apparatus is broken down because of a problem in the communication channel, information from the no key press detecting means 4 cannot be transmitted. Therefore, a wrong repeat operation of a key cannot be prevented by installing the no key press detecting means 4.

That is to say, in the case of a device such as a wired keyboard which is physically connected to a main unit of an apparatus, a release code can be always transmitted in any way, and therefore a wrong repeat operation of a key would not be performed. However, in the case of a wireless keyboard, there is a possibility that a wrong repeat operation is performed when a communication channel is interrupted and thereby the key repeat operation is repeated endlessly.

SUMMARY OF THE INVENTION

An object of the invention is to provide a wireless input apparatus which is capable of recognizing the end of an operation with reliability even when any trouble occurs in a wireless communication channel.

Another object of the invention is to provide a wireless input apparatus which is capable of preventing a wrong repeat operation even when a wireless communication channel is interrupted.

The invention provides a wireless input apparatus comprising an entry unit for use in input operation and a processing unit for performing a process of generating data associated with the operation to the entry unit, the entry unit and the processing unit being connected to each other via a wireless communication channel, the entry unit including an operation detecting section for detecting a start and end of input operation and a signal transmitting section for transmitting an operation signal via the wireless communication channel at a time when the operation detecting section detects a start of input operation and at predetermined intervals from the time of detection of the start of the input operation to a time when the operation detecting section detects an end of the input operation, and the processing unit including an end-of-operation judging timer for measuring a threshold time which is set to be longer than the predetermined interval of the signal transmitting section of the entry unit, a signal receiving section for receiving the signal transmitted from the signal transmitting section of the entry unit via the wireless communication channel, and a processing section for recognizing an input operation and causing the end-of-operation judging timer to start measuring a threshold time when the signal receiving section receives the operation signal, and when the measurement of the threshold time by the end-of-operation judging timer is ended, recognizing an end of the input operation and generating data in accordance with a recognition result.

According to the invention, a start and end of an input operation to the entry unit are detected by the operation detecting section. The signal transmitting section of the entry unit transmits an operation signal via the wireless communication channel at predetermined intervals between detection of a start of an operation and detection of an end of the operation by the operation detecting section. The processing section causes the end-of-operation judging timer to measure a threshold time which is set so as to be longer than the interval in the signal transmitting section of the entry unit. The signal receiving section of the processing unit receives a signal transmitted from the signal transmitting section of the entry unit via the wireless communication channel. When the operation signal is inputted to the signal receiving section, the processing section recognizes the input operation and causes the end-of-operation judging timer to start measuring a threshold time. When the end-of-operation judging timer has ended the measurement of the threshold time, the processing section recognizes an end of the input operation. In the case where a next operation signal from the entry unit is received by the signal receiving circuit before the end of measurement of the threshold time by the end-of-operation judging timer, the end-of-operation judging timer starts measuring the threshold time again. In the case where the operation signal from the entry unit is received at predetermined intervals, the end-of-operation judging timer would not end the measurement of the threshold time. When reception of the operation signal at predetermined intervals is stopped due to a trouble in the wireless communication channel, the end-of-operation judging timer ends the measurement of the threshold time, whereby the processing section can recognize the end of the input operation. Since an end of an input operation is recognized, a process of generating data in accordance with a recognition result can be completed.

As described above, according to the invention, the processing section is capable of reliably recognizing an end of an input operation to the entry unit composing the wireless input apparatus even when a trouble occurs in the wireless communication channel, so that a wrong operation can be prevented from being performed since the processing unit is capable of recognizing a start of an input operation but incapable of recognizing the end of the input operation.

In the invention it is preferable that the processing unit further includes a repeat-of-operation judging timer which is set for a reference time for considering the input operation as being repeated, in the case where an input operation status still continues after the start of the input operation to the entry unit, the threshold time of the end-of-operation judging timer is preset to be shorter than the reference time, and the processing section causes the repeat-of-operation judging timer to start measuring the reference time when the signal receiving section receives a first operation signal, and repeatedly generates data associated with the input operation in the case where the repeat-of-operation judging timer has ended the measurement of the reference time although an end of the input operation is not recognized yet.

According to the invention, the processing unit includes the repeat-of-operation judging timer which is set for a reference time for judging the input operation as continuing on in the case where an input operation status continues after the start of the input operation to the entry unit. When the signal receiving section receives a first operation signal from the entry unit, the processing section of the processing unit causes the repeat-of-operation judging timer to start measuring the reference time. A threshold time shorter than the reference time is set in the end-of-operation judging timer, so that in the case where the signal receiving section does not receive an operation signal from the entry unit for the threshold time, the processing section recognizes that the input operation is ended. In the case where the signal receiving section receives an operation signal repeatedly and the reference time has elapsed from reception of the first operation signal, the end of the input operation is not recognized yet, so that the input operation can be repeated by repeatedly generating data associated with the input operation.

As described above, according to the invention, when an input operation to the entry unit continues for a reference time or more, the processing section can recognize that the input operation continues, and even when a trouble occurs in the wireless communication channel and reception of an operation signal from the entry unit by the processing unit is stopped, the input operation is judged as having ended as long as the threshold time has elapsed. Therefore, it is possible to prevent a wrong operation of judging that an input operation is repeated.

In the invention it is preferable that the processing unit further includes an information transmitting section for transmitting information to the entry unit via the wireless communication channel, and a processing-side control section for controlling communication of information and signals with the entry unit via the information transmitting section and the signal receiving section, the entry unit further includes an information receiving section for receiving information from the processing section via the wireless communication channel, and an entry-side control section for controlling communication of information and signals with the processing unit via the information receiving section and the signal transmitting section, and the processing-side control section and the entry-side control section control the communication of information and signals according to a predetermined procedure, judge after an end of the communication whether or not the communication was normally performed, and perform the communication again when judging that communication was not normally performed.

According to the invention, the processing unit includes the information transmitting section for transmitting information to the entry unit via the wireless communication channel, and the processing-side control section for controlling communication of information and signals with the entry unit via the information transmitting section and the signal transmitting section. The entry unit includes then information receiving section for receiving information from the processing unit via the wireless communication channel, and the entry-side control section for controlling communication of information and signals with the processing unit via the information receiving section and the signal transmitting section. The processing-side control section and the entry-side control section control the communication of information and signals according to a predetermined procedure. The processing-side control section and the entry-side control section judge after the end of the communication whether the communication was normally performed or not, and perform communication again when judging that the communication was not normally performed. Therefore, communication of signals and information can be performed with reliability between the entry unit and the processing unit.

As described above, according to the invention, when transmission of information and signals between the entry unit and the processing unit via the wireless communication channel is not normally performed, the communication is performed again, so that mutual communication of information and signals can be performed with reliability.

In the invention it is preferable that infrared rays are used as a communication medium in the wireless communication channel.

According to the invention, details of the input operation to the entry unit can be transmitted to the processing unit via a wireless communication channel in which infrared rays are used as a medium. Since infrared rays are used as a medium, a wireless communication channel over a relatively short distance can be formed with ease. As described above, according to the invention, infrared rays are used as a medium in the wireless communication channel, so that details of an input operation to the entry unit can be transmitted to the processing unit with a relatively simple configuration.

In the invention it is preferable that radio waves are used as a communication medium in the wireless communication channel.

According to the invention, radio waves are used as a medium to perform wireless communication from the entry unit to the processing unit, so that a signal associated with an input operation to the entry unit can be transmitted to the processing unit even in the case of transmission over a relatively long distance. As described above, according to the invention, radio waves are used as a medium in the wireless communication channel, so that details of an input operation can be transmitted from the entry unit to the processing unit in a relatively wide range.

In the invention it is preferable that visible light is used as a communication medium in the wireless communication channel.

According to the invention, details of the input operation to the entry unit can be transmitted to the processing unit with visible light used as a medium. Since visible light is used as a medium, the operator can visually check the wireless communication channel and judge with ease whether a trouble occurs or not. As described above, according to the invention, visible light is used as a medium in the communication channel to transmit details of an input operation from the entry unit to the processing unit, so that the operator can check a forming status of the wireless communication channel from the surroundings.

In the invention it is preferable that a keyboard is used as the entry unit.

According to the invention, in the case of using a keyboard as the entry unit, it is possible to reliably cause the processing unit to recognize details of the input operation to the keyboard including a key release.

In the invention it is preferable that a mouse is used as the entry unit.

According to the invention, in the case of using a mouse as the entry unit, it is possible to reliably cause the processing unit to recognize details of an operation of a button of the mouse including a release operation of the button.

In the invention it is preferable that a game pad is used as the entry unit.

According to the invention, in the case of using a game pad as the entry unit, it is possible to reliably cause the processing unit to recognize details of the input operation to the game pad including a release operation of a button.

In the invention it is preferable that a tablet is used as the entry unit.

According to the invention, in the case of using a tablet as the entry unit, it is possible to reliably cause the processing unit to recognize details of an operation of a button of the tablet including a release operation of the button.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENT

Figure 1:
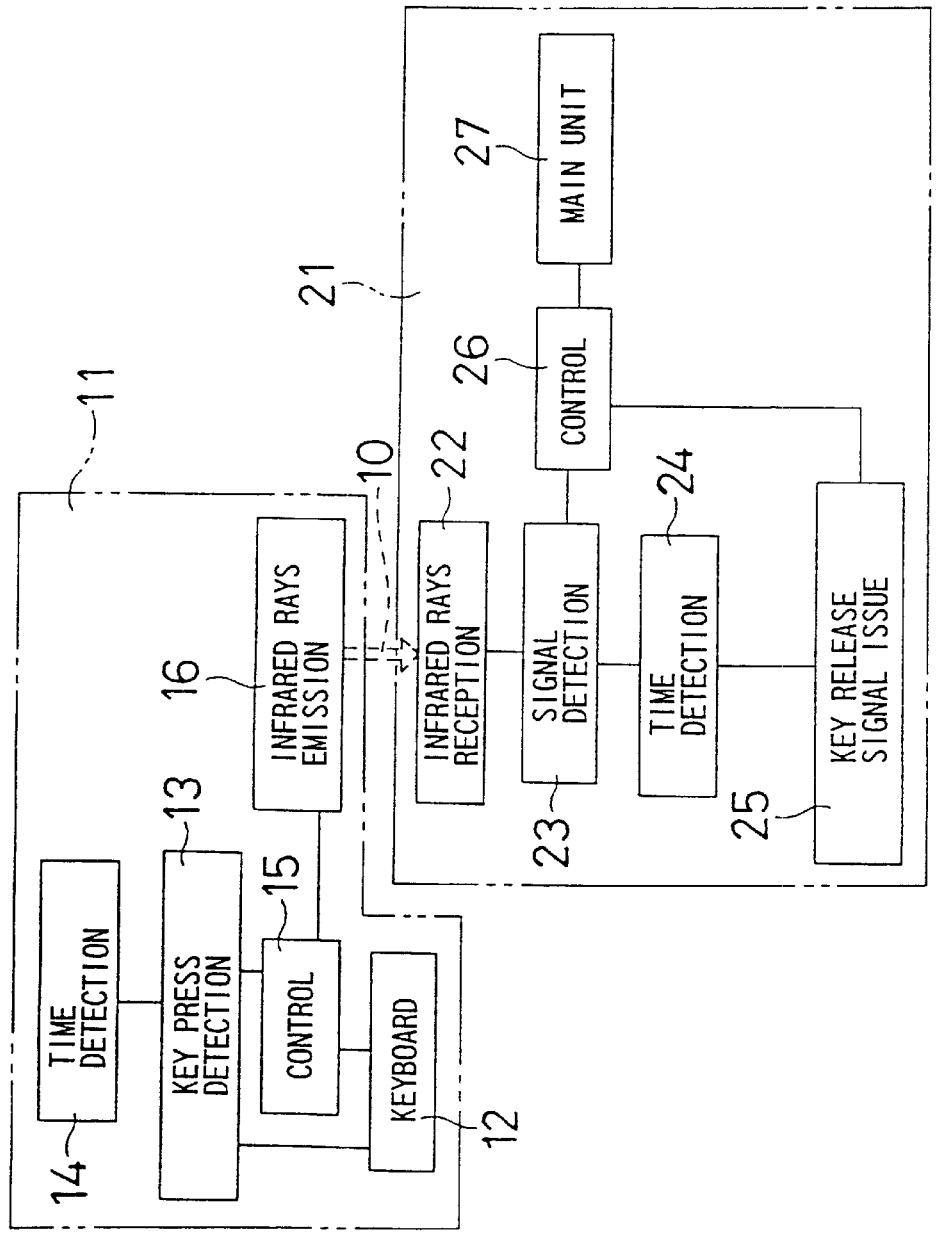
FIG. 1 is a schematic block diagram showing an electrical configuration relating to a wireless keyboard 11 as a first embodiment of the invention.
Figure 2:
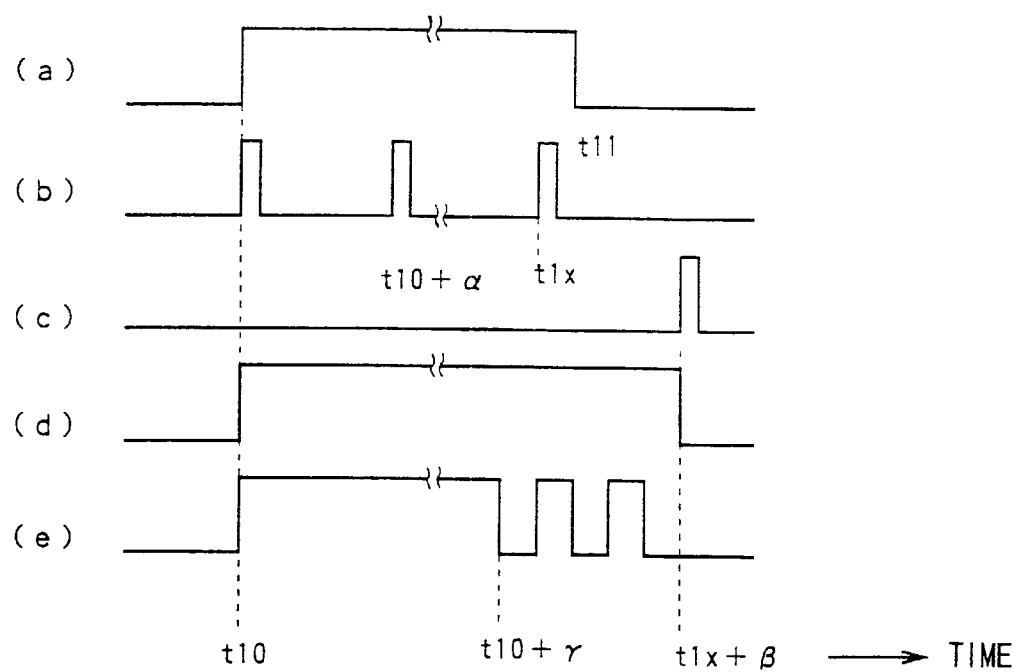
FIGS. 2(a)–2(e) are time charts showing a timing relation between a key operation and recognition of the operation in the embodiment shown in FIG. 1.

Now referring to the drawings, preferred embodiments of the invention are described below.

Referring to FIGS. 1 to 27, first to twenty-fourth embodiments of the invention will be introduced below. In the respective embodiments, a component equivalent to a component in a previously introduced embodiment will be denoted by the same reference numeral, whereby a duplicated explanation for the component will be omitted. Although infrared rays, radio waves, and visible light is used as a medium in a wireless communication channel in the embodiments introduced below, it is also possible to use ultrasonic waves or the like.

FIG. 1 shows a configuration relating to a wireless keyboard 11 in which infrared rays 10 are used in a wireless communication channel, as a first embodiment of the invention. The wireless keyboard 11 is provided with a keyboard 12 as an entry unit. A key press detecting section 13 which serves as an operation detecting section detects an operation of pressing a key of the keyboard 12 to be subjected to a pressing operation. In the embodiment, while the key press detecting section 13 continuously detects an operation of pressing a key, a time detecting section 14 detects a predetermined time interval a. A control section 15 controls an infrared rays emitting section 16 so as to transmit a key press signal which is associated with an input operation to the keyboard 12, at every fixed time a detected by the time detecting section 14, by using the infrared rays 10.

The signal transmitted from the infrared rays emitting section 16 serving as a signal transmitting section by using the infrared rays 10 as a medium is received by an infrared rays receiving section 22 which serves as a signal receiving section of a processing unit 21 installed in an information equipment such as a personal computer or a word processor. The key press signal transmitted from the wireless keyboard 11 and received by the infrared rays receiving section 22 is detected as an operation signal by a signal detecting section 23. When the operation signal is detected, a time detecting section 24 which serves as an end-of-operation judging timer starts to measure a threshold time β. After a lapse of the threshold time β, a key release signal is issued by a key release signal issuing section 25 and supplied to a control section 26. The control section 26 recognizes time from a first reception of a key press signal to issue of a key release signal as an operation time of the keyboard 12, and transmits a recognition result to a main unit 27. It is also possible to transmit a key release signal from the wireless keyboard 11 and notify the main unit 27 that an operation is ended.

FIGS. 2(a)–2(e) show a key press signal generated by the wireless keyboard 11 and details of an input operation recognized by the control section 26 shown in FIG. 1. Assume that as shown in FIG. 2(a), in the wireless keyboard 11, an operation of pressing a certain key is started at a time t10 and the pressing operation is ended at a time t11. As shown in FIG. 2(b), a key press signal is generated by the wireless keyboard 11 at the time t10, and thereafter the key press signal is transmitted at every fixed time α. As shown in FIG. 2(c), in the control section 26, after a lapse of a threshold time β from last reception of the key press signal at a time t1x, a key release signal is issued from the key release signal issuing section 25. Accordingly, as shown in FIG. 2(d), it is recognized that the input operation to the key was started at the time t10 and the key operation was ended at a time t1x+β. In the case where an auto-repeat function is included, as F shown in FIG. 2(e), measurement of a reference time γ for repeating is started at an instant when the first key press signal is received at the time t1x, and the auto-repeat function is operated if an instant of a time t10+γ is earlier than an instant of the time t1x+β. A repeat-of-operation judging timer for auto-repeat is installed, for example, in the control section 26.

Figure 3A:
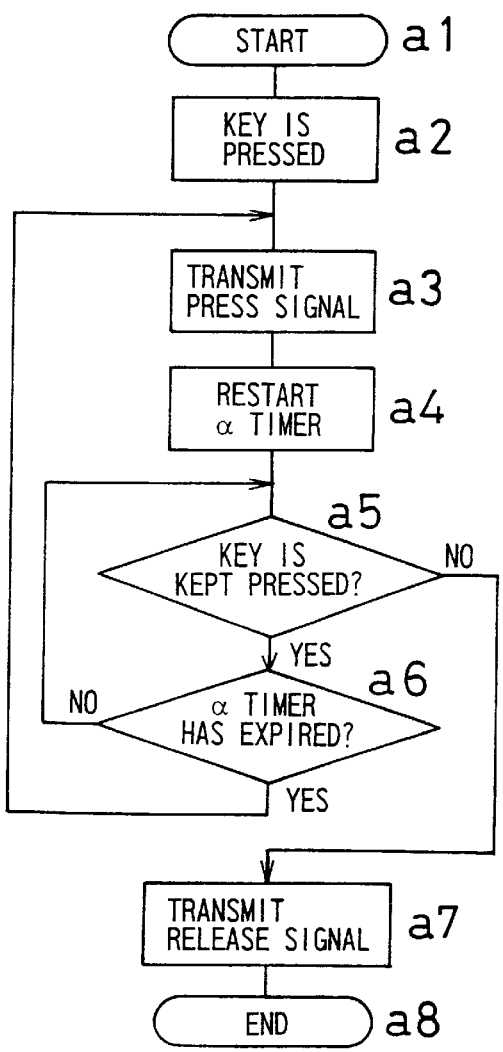
FIGS. 3A, 3B are flowcharts showing operation procedures of the wireless keyboard 11 and a processing unit 21 in the embodiment shown in FIG. 1.
Figure 3B:
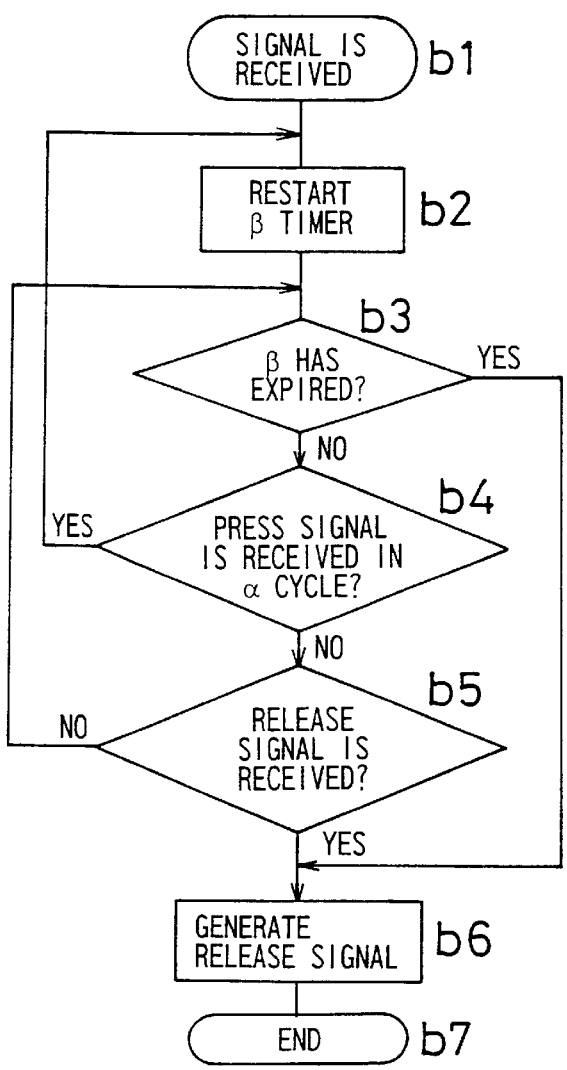
Figure 4:
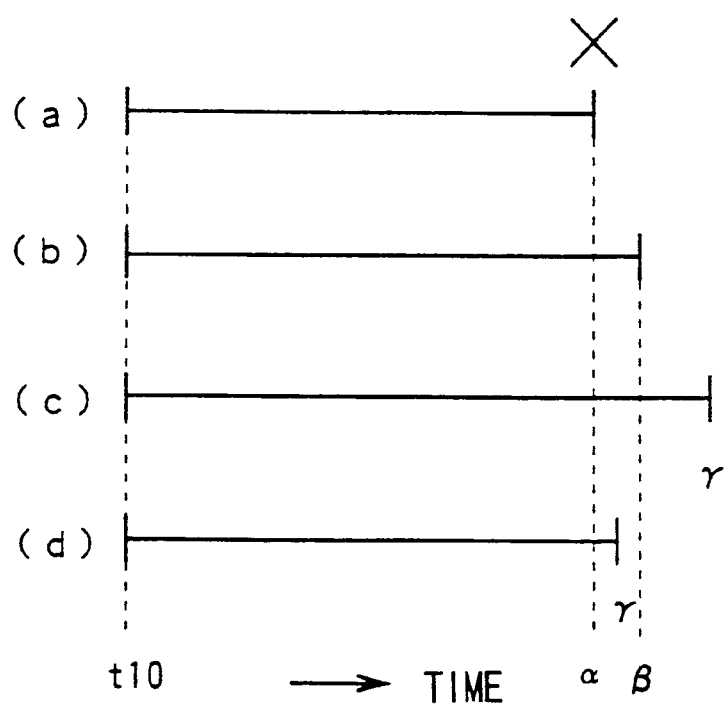
FIGS. 4 (a)–4(d) are time charts showing a relation among a time interval α, a threshold time β, and a reference time γ in the embodiment shown in FIG. 1.

FIGS. 3A, 3B show operation procedures corresponding to the details of the input operation shown in FIG. 2(a) and the key press signal shown in FIG. 2(b). FIG. 3A shows a signal transmitting procedure by the wireless keyboard 11. The procedure is started at step a1, it is detected at step a2 by the key press detecting section 13 that an operation of pressing a key of the keyboard 12 is conducted, and a key press signal which represents the operation of pressing the key and its code is transmitted at step a3. At step a4, a timer for a time a of the time detecting section 14 is restarted. At step a5, it is judged whether the key is kept pressed or not. When it is judged that the key is kept pressed, it is judged at step a6 whether measurement of the interval a by the timer of the time detecting section 14 has expired or not. When it is judged that the time $\alpha$ has not expired, the operation goes back to step a5. When it is judged at step a6 that the time $\alpha$ has expired, the operation goes back to step a3 to transmit a next key press signal, and the timer is restarted at step a4 to start measuring the time $\alpha$ again. When it is judged at step a5 that the key is not kept pressed, a key release signal is transmitted at step a7, and a procedure corresponding to a single key operation is ended at step a8.

FIG. 3B shows a main procedure by the processing unit 21. When a signal from the wireless keyboard 11 is received at step b1, a timer for a threshold time $\beta$ of the time detecting section 24 is restarted at step b2. At step b3, it is judged whether the threshold time $\beta$ measured by the timer has expired or not. When it is judged that the threshold time $\beta$ has not expired, it is judged at step b4 whether or not the key press signal is received in a time cycle of an interval $\alpha$. When the signal is received periodically, the operation goes back to step b2. When it is judged at step b4 that the key press signal is not received periodically, it is judged at step b5 whether a key release signal from the wireless keyboard 11 is received or not. When the signal is received, the operation goes to step b6. When the signal is not received, the operation goes back to step b3. When it is judged at step b3 that the threshold time $\beta$ has expired, a key release signal is issued by the key release signal issuing section 25 at step b6, and the procedure is ended at step b7.

FIGS. 4(a)–4(d) clarify a reason that as shown in FIG. 2(c), in the case where an auto-repeat function is started after a lapse of a fixed time y from reception of a first key press signal, a threshold time $\beta$ needs to be shorter than the reference time $\gamma$. Assume that as shown in FIG. 4(a), the first key press A signal is generated at a time t10 and thereafter the processing unit 21 cannot receive the key press signal at every time interval a for some reason. The threshold time $\beta$ shown in FIG. 4(b) for automatically judging that the key is released needs to be longer than the time interval $\alpha$. That is to say, a condition of $\alpha<\beta$ needs to be satisfied. In the case where this condition is not satisfied, even when a key press signal is received normally at every time interval $\alpha$, it is judged in advance that the key is released. As shown in FIG. 4(c), the repeat-of-operation judging reference time $\gamma$ for judging that an auto-repeat operation is conducted needs to be longer than the threshold time $\beta$. In the case of $\beta>\gamma$, as shown in FIG. 4(d), even in the case where a key press signal is received only once at the time t10, the time $\gamma$ has already elapsed before an instant when it is automatically judged that the key is released after a lapse of the threshold time $\beta$ from the time t10, with the result that an auto-repeat operation is started. In other words, once a key press signal is generated, an auto-repeat mode automatically works unless a key release signal is transmitted, with the result that it is recognized by mistake that a key input operation is conducted plural times although the key is operated only once.

Figure 5:
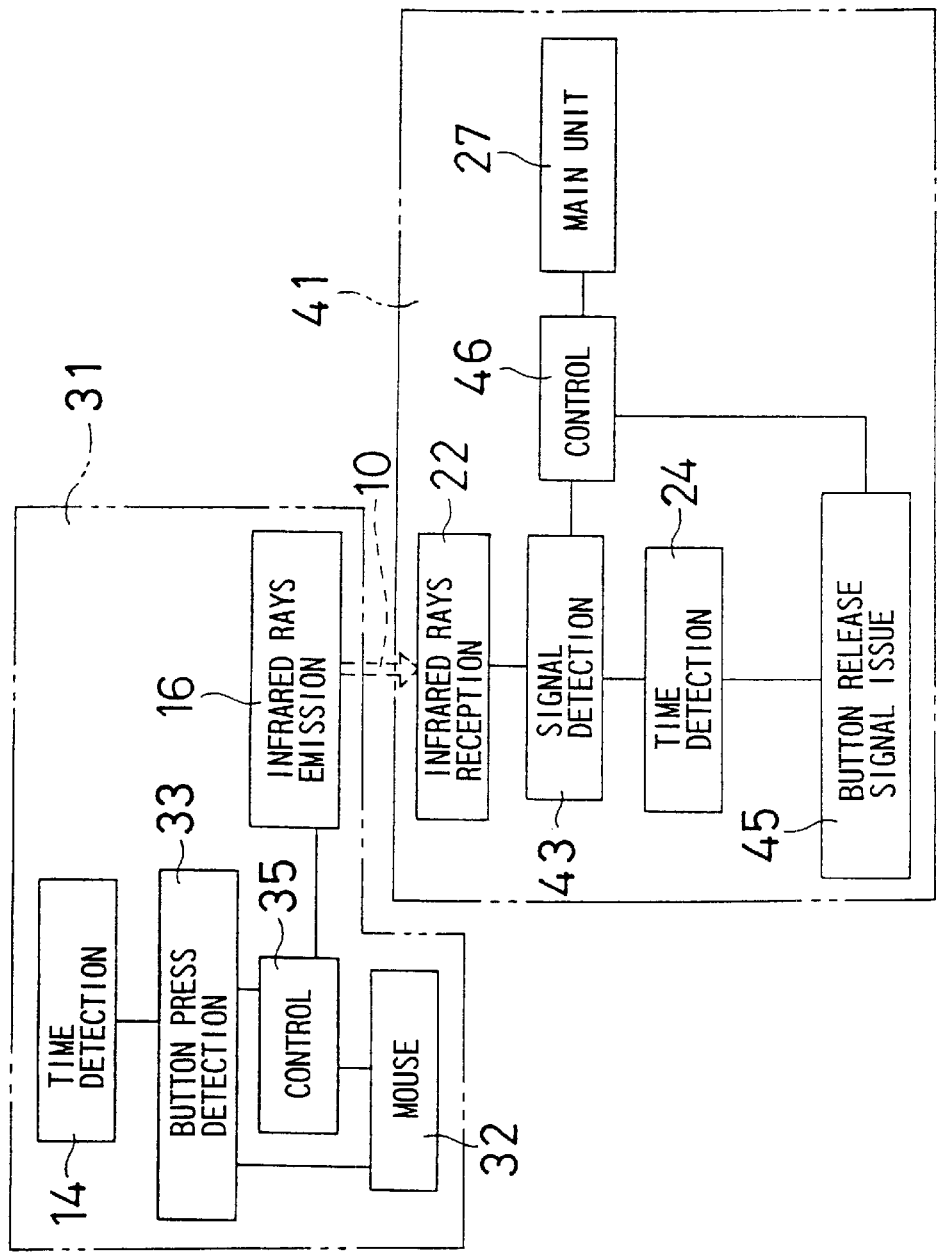
FIG. 5 is a schematic block diagram showing an electrical configuration relating to a wireless mouse 31 as a second embodiment of the invention.

FIG. 5 schematically shows an electrical configuration relating to a wireless mouse 31 in which a wireless communication channel is formed by using infrared rays 10 as a second embodiment of the invention. The wireless mouse 31 is provided with a mouse 32 which generates a signal representing a two-dimensional stroke as an operation signal by a manual plane operation. The mouse 32 is provided with a plurality of buttons. Operations of the buttons are so-called "click," "double click," "drop and draw," or the like, which are basics of a mouse operation, and a button press signal when an operation is started and a button release signal when the operation is ended have important meanings. A button press detecting section 33 detects a pressing operation from among input operations of the buttons placed on the mouse 32. A control section 35 generates a signal which represents a two-dimensional stroke of the mouse 32 and a button press signal when the button press detecting section 33 detects that a button is pressed, and transmits the signals to a processing unit 41 via an infrared rays emitting section 16. When the button press detecting section 33 continuously detects that a button is pressed, the control section 35 executes control of transmitting a button press signal at intervals of a time $\alpha$ detected by a time detecting section 14.

In the processing unit 41, a signal detecting section 43 detects a button press signal which is an operation signal from the wireless mouse 31 and a signal which represents a two-dimensional stroke. A time detecting section 24 is restarted every time when a button press signal is received, and after a lapse of a threshold time $\beta$, a button release signal is supplied from a button release issuing section 45 to a control section 46, whereby the operation of the button is recognized and transmitted to a main unit 27.

Figure 6:
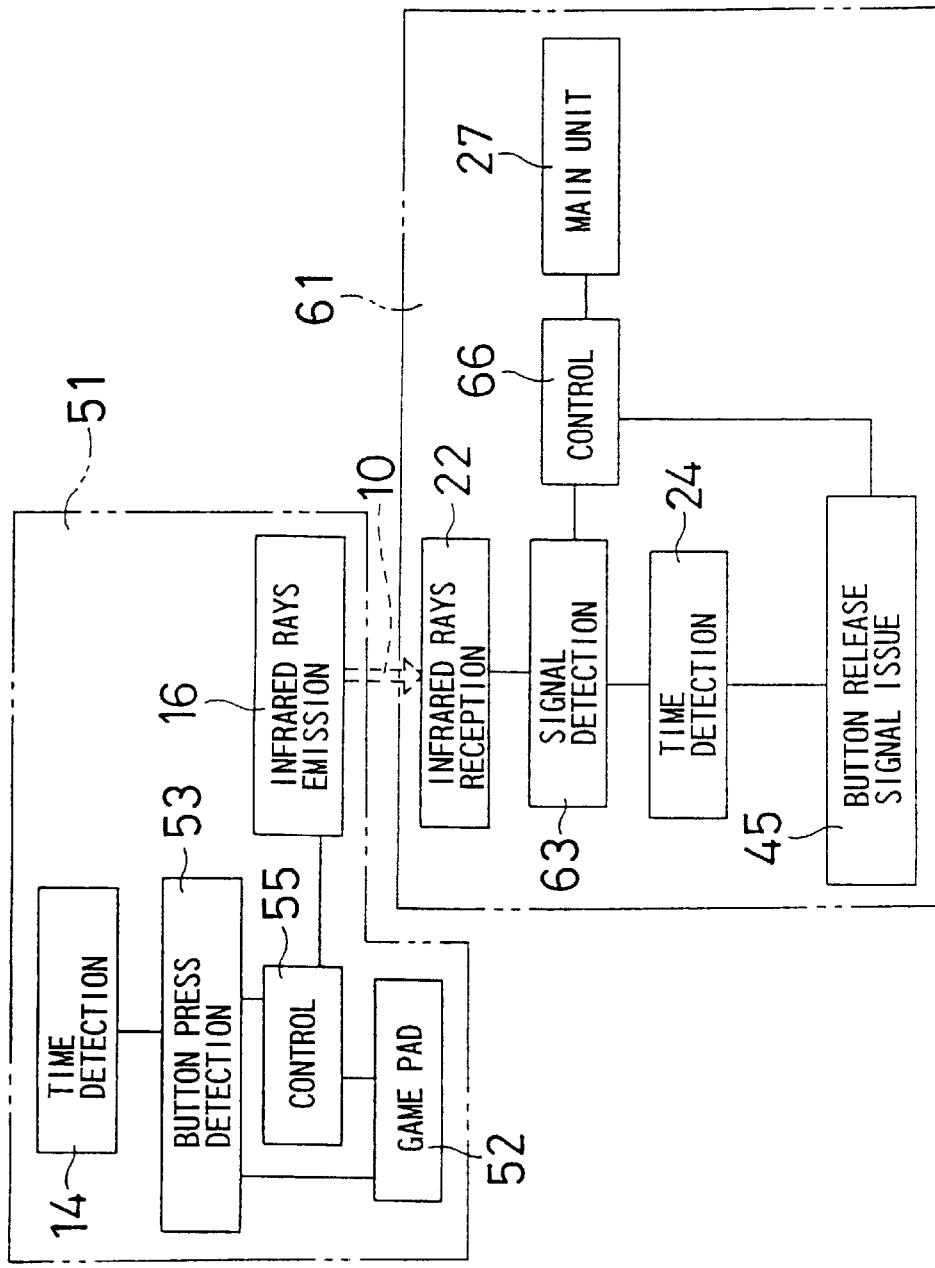
FIG. 6 is a schematic block diagram showing an electrical configuration relating to a wireless game pad 51 as a third embodiment of the invention.

FIG. 6 shows, as a third embodiment of the invention, a configuration to transmit details of an input operation of a game pad 52 from a wireless game pad 51 via a wireless communication channel in which infrared rays 10 are used as a medium. The game pad 52 is also provided with a plurality of buttons, and an operation of pressing the buttons is detected by a button press detecting section 53. When the button press detecting section 53 detects a button being pressed, a control section 55 causes an infrared rays emitting section 16 to transmit a button press signal. Further, when the button is kept pressed, a button press signal is repeatedly transmitted at intervals of a time $\alpha$ measured by a time detecting section 14. The control section 55 also controls the infrared rays emitting section 16 so as to transmit a signal which represents details of an operation of a portion other than the buttons of the game pad 52.

In a processing unit 61, an infrared rays receiving section 22 receives an operation signal which represents details of an input operation of the game pad 52 transmitted by using the infrared rays 10 as a medium, and a signal detecting section 63 detects the operation of the game pad 52. When a button press signal is detected, measurement of a threshold time $\beta$ by a time detecting section 24 is restarted. When a button press signal is not received after the time detecting section 24 measures the threshold time $\beta$, a button release issuing section 45 issues a button release signal. A control section 66 recognizes a signal which represents details of an operation of the game pad 52 detected by the signal detecting section 63 or a button release signal which is issued by the button release issuing section 45, and transmits to a main unit 27.

Figure 7:
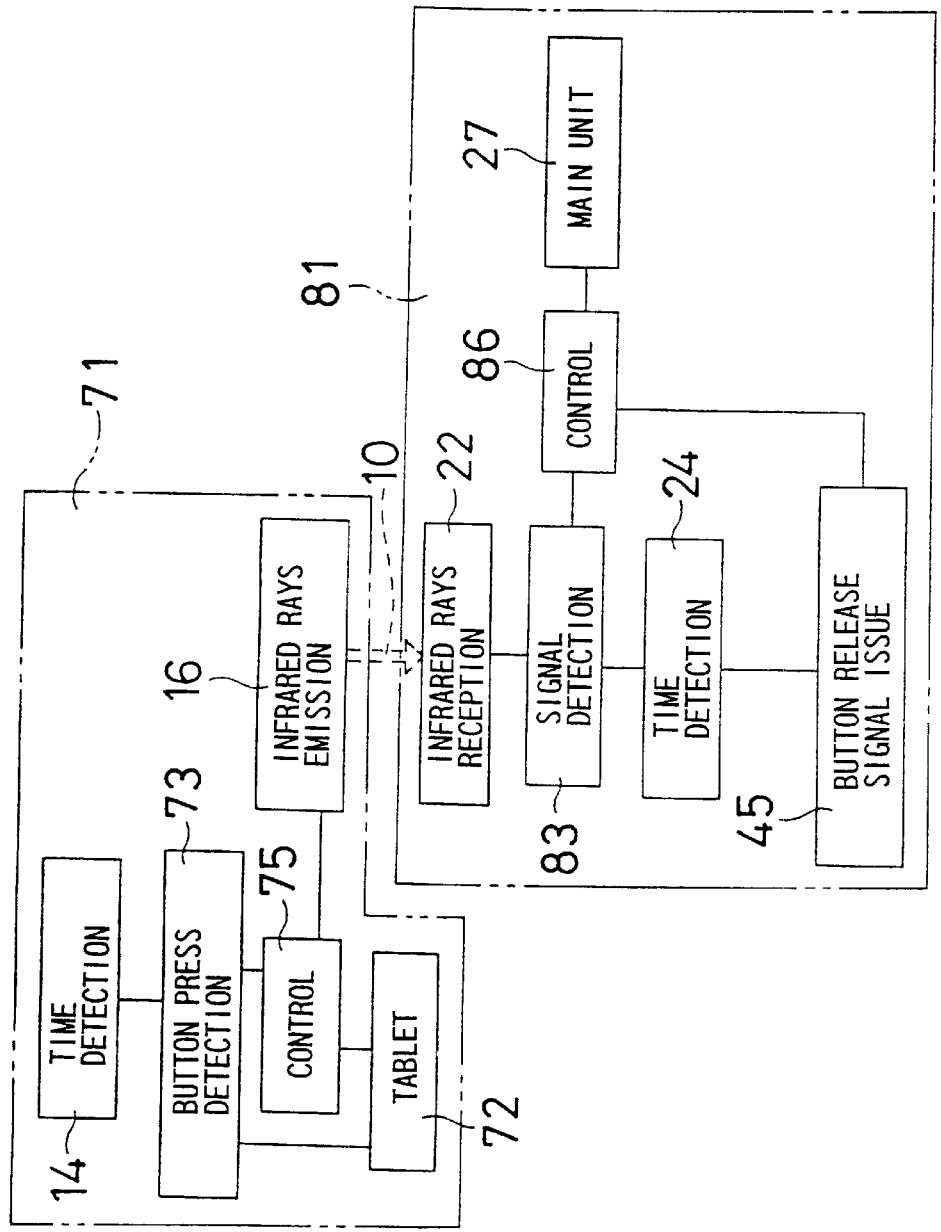
FIG. 7 is a schematic block diagram showing an electrical configuration relating to a wireless tablet 71 as a fourth embodiment of the invention.

FIG. 7 shows a configuration relating to a wireless tablet 71 as a fourth embodiment of the invention. In the wireless tablet 71, a button press detecting section 73 detects an input operation of a button placed on a tablet 72, as well as input of designation of a plane coordinate on the tablet 72. A control section 75 generates a button press signal which represents designation of a two-dimensional coordinate on the tablet 72 and a button pressing operation detected by the button press detecting section 73, and causes an infrared rays emitting section 16 to transmit the signal to a processing unit 81 by using infrared rays 10 as a medium.

In the processing unit 81, an infrared rays receiving section 22 receives the signal transmitted from the wireless tablet 71. A signal detecting section 83 detects details of the input operation of the tablet 72 from the signal received by the infrared rays receiving section 22. When a button press signal is detected, measurement of a threshold time β by a time detecting section 24 is restarted. After the time detecting section 24 measures the threshold time β, a button release issuing section 45 issues a button release signal. A control section 86 recognizes the designating operation of the two-dimensional coordinate on the tablet 72 detected by the signal detecting section 83, the button press signal, and the button release signal issued by the button release issuing section 45, and transmits to a main unit 27.

As described above, in the first to fourth embodiments, an operation signal is communicated by wireless with the infrared rays 10 used as a medium, from the wireless keyboard 11, the wireless mouse 31, the wireless game pad 51, or the wireless tablet 71, which serve as an entry unit, to the processing unit 21, 41, 61, 81. In the wireless communication channel in which the infrared rays 10 are used as a medium, communication is interrupted when a trouble occurs during communication, for example. In the case of a device such as a wired keyboard which is physically connected to a main unit of an apparatus, after transmitting a press code of a key or a button, it is possible to somehow transmit a corresponding release code. Therefore, even in the case where the keyboard has a repeat function, it would not happen that a repeat operation is performed endlessly. However, in the case of a wireless keyboard or the like, a release code is not received when a wireless communication channel is interrupted. Hence, there is a possibility that an operation is recognized as being continued indefinitely and a key repeat operation is performed endlessly.

As a measure to solve the problems mentioned above, the following two measures can be thought of.

① When an entry unit transmits data, the entry unit sequentially transmits a press code which represents a start of an operation and a release code which represents the end of the operation as a set, and the entry unit also deals with a repeat operation and transmits both a press signal and a release signal as a set at predetermined intervals.

② A timeout regulation during data interruption is established between an entry unit and a processing unit, and when a release code is not received after a lapse of a predetermined time, it is judged that an operation is ended and the processing unit stops a repeat operation.

In the case of the measure ①, there is a problem that in the case where a communication channel is interrupted during a minimal time gap between transmission of a press code and transmission of a release code, a repeat function is performed endlessly. Therefore, the measure ① cannot become a fundamental solution. On the other hand, the measure ② is capable of addressing not only interruption of a communication channel but also an unreached release code due to a noise or the like. Therefore, the measure ② can become a fundamental solution. In the first to fourth embodiments, the problems are solved by following the measure ②.

Figure 8:
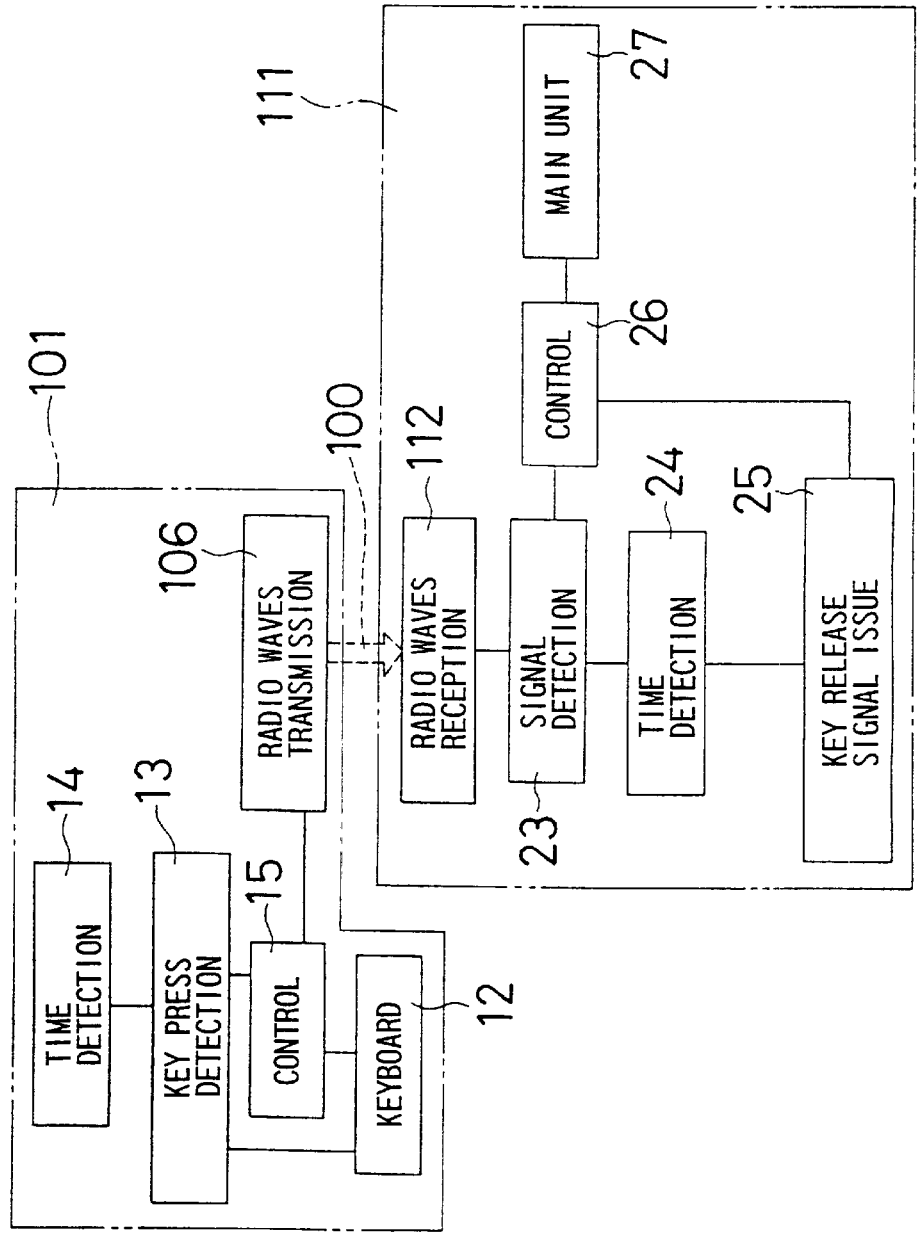
FIG. 8 is a schematic block diagram showing an electrical configuration relating to a wireless keyboard 101 as a fifth embodiment of the invention.

FIG. 8 schematically shows an electrical configuration relating to a wireless keyboard 101 in which radio waves 100 are used as a medium in a wireless communication channel, as a fifth embodiment of the invention. The wireless keyboard 101 is composed by replacing the infrared rays emitting section 16 included in the wireless keyboard 11 as shown in FIG. 1, with a radio waves transmitting section 106. Further, a processing unit 111 is composed by replacing the infrared rays receiving section 22 included in the processing unit 21 as shown in FIG. 1, with a radio waves receiving section 112. With regard to the radio waves 100 used as a medium in the wireless communication channel between the radio waves transmitting section 106 and the radio waves receiving section 112, it is possible to set the frequency, the power output, the modulation scheme and so on in various ways.

Figure 9:
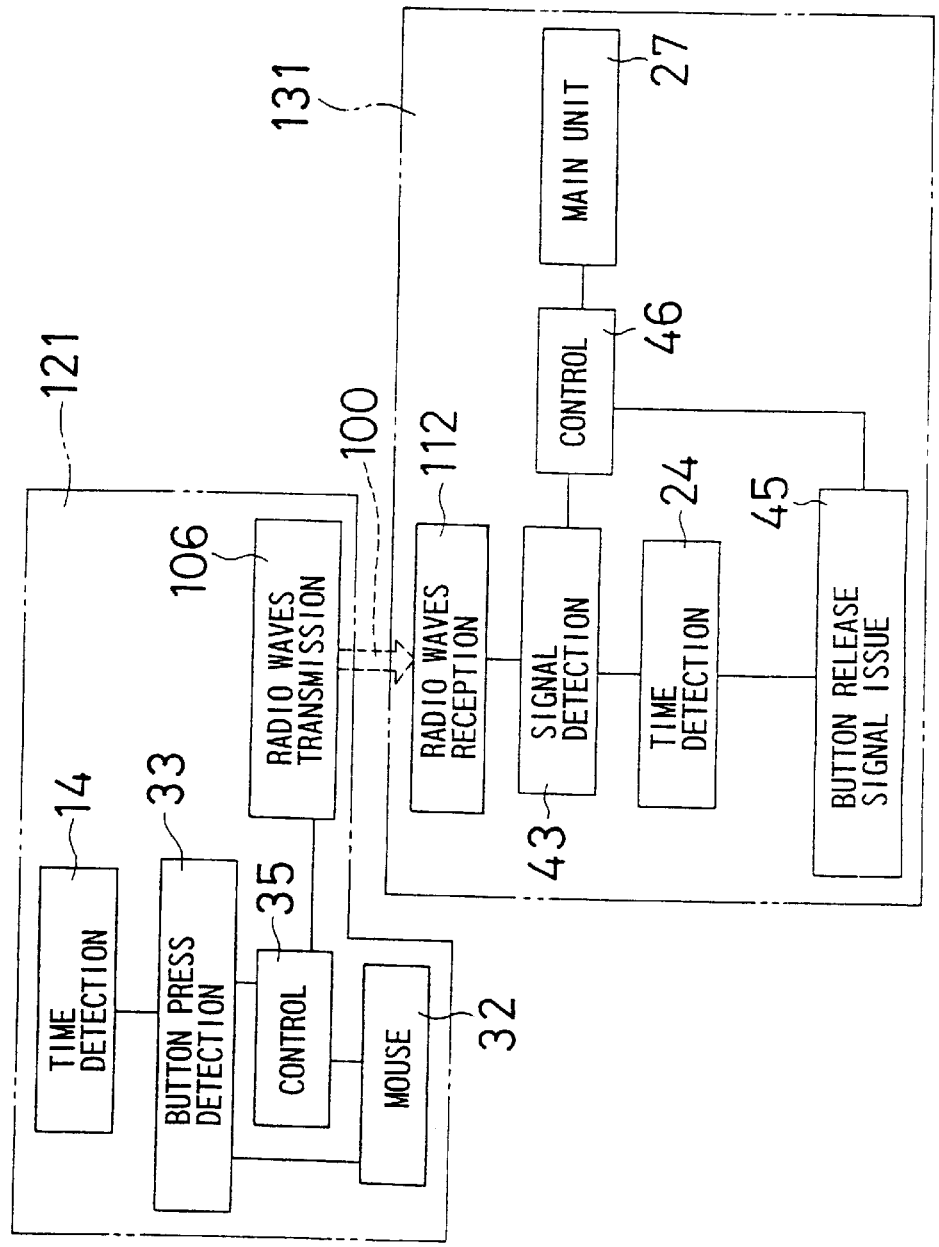
FIG. 9 is a schematic block diagram showing an electrical configuration relating to a wireless mouse 121 as a sixth embodiment of the invention.
Figure 10:
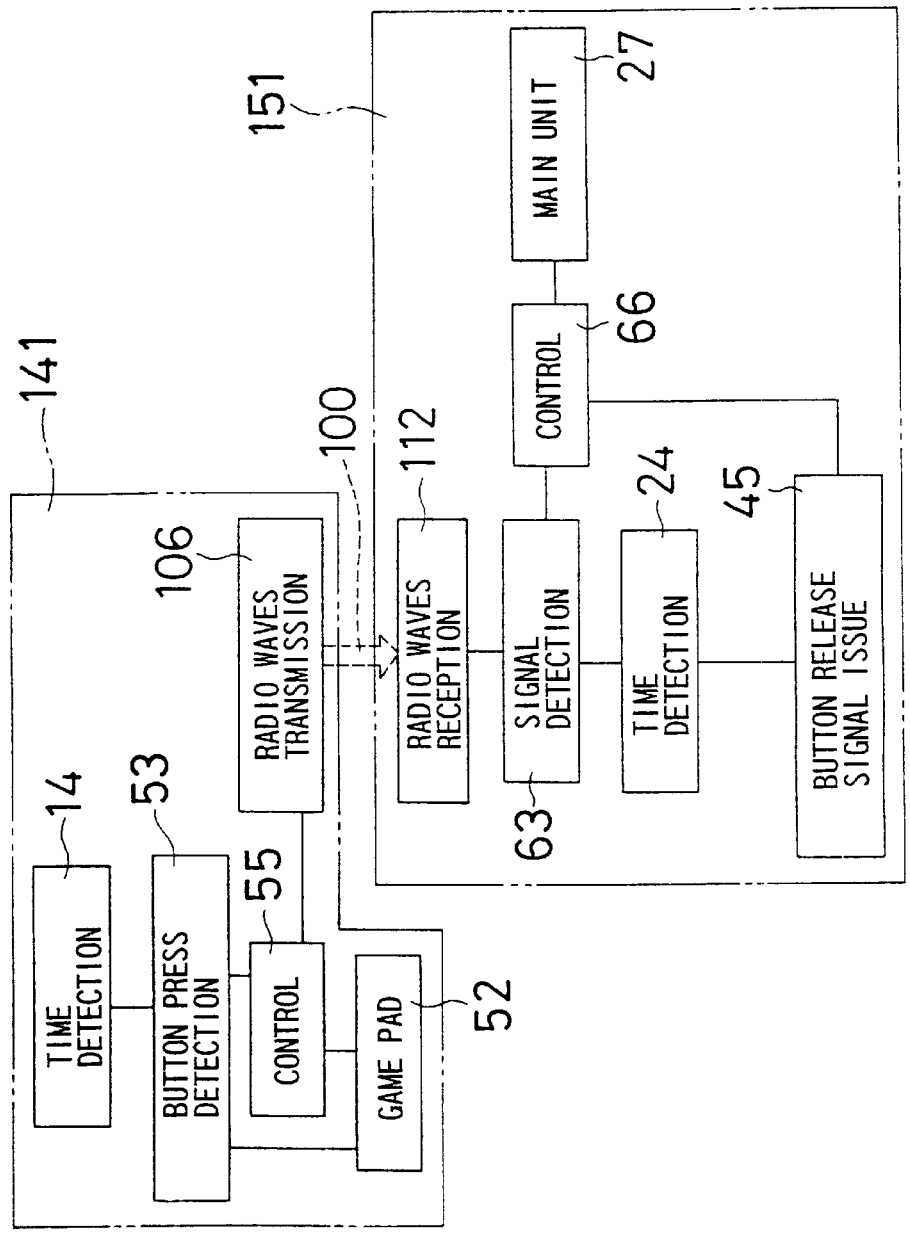
FIG. 10 is a schematic block diagram showing an electrical configuration relating to a wireless game pad 141 as a seventh embodiment of the invention.
Figure 11:
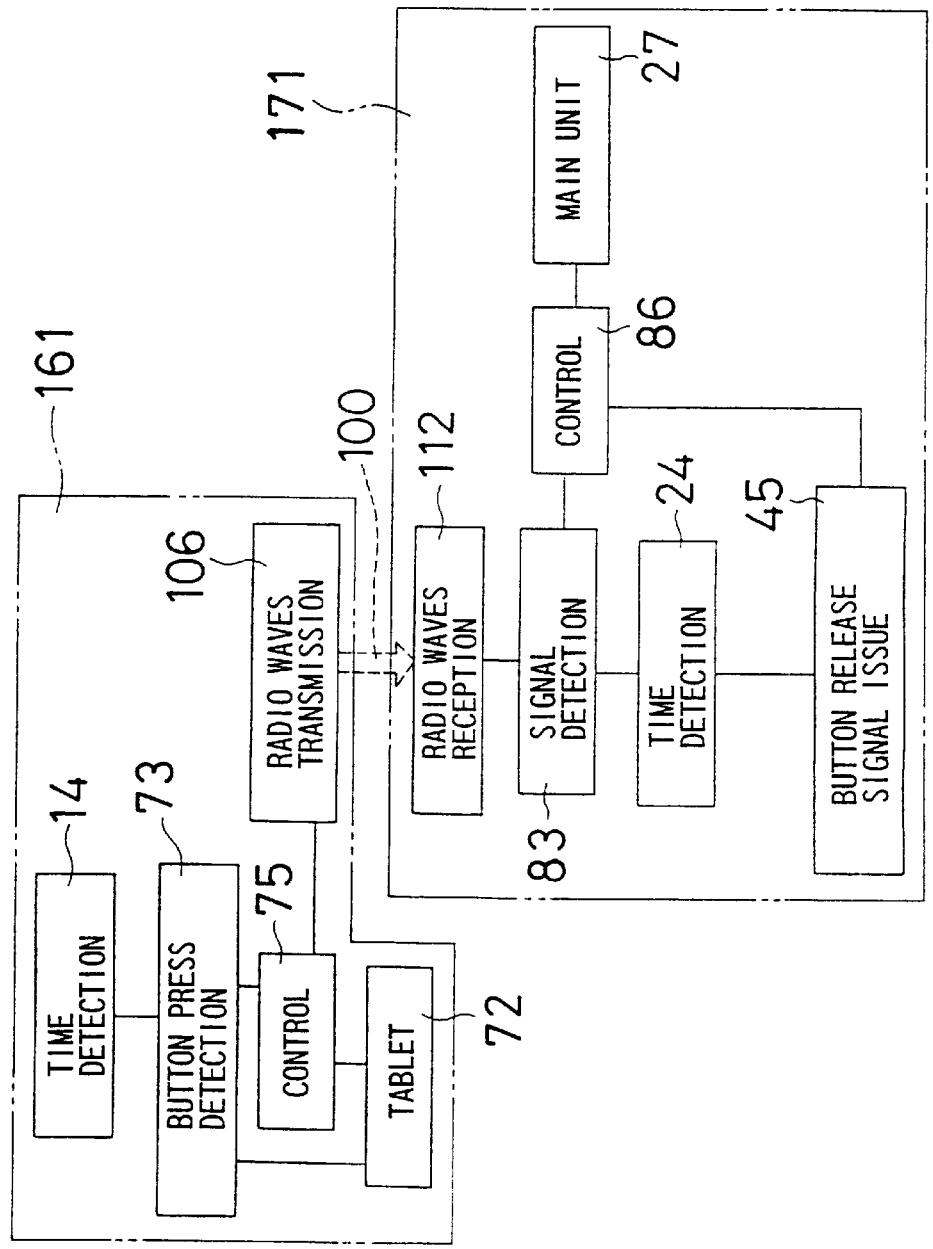
FIG. 11 is a schematic block diagram showing an electrical configuration relating to a wireless tablet 161 as an eighth embodiment of the invention.

FIG. 9 schematically shows a configuration relating to a wireless mouse 121 in which radio waves 100 are used as a medium in a wireless communication channel, as a sixth embodiment of the invention. The wireless mouse 121 of the embodiment is composed by replacing the infrared rays emitting section 16 included in the wireless mouse 31 as shown in FIG. 5, with a radio waves transmitting section 106. Further, a processing unit 131 is composed by replacing the infrared rays receiving section 22 included in the processing unit 41 as shown in FIG. 5, with a radio waves receiving section 112. FIG. 10 schematically shows an electrical configuration relating to a wireless game pad 141 in which radio waves 100 are used as a medium, as a seventh embodiment of the invention. The wireless game pad 141 of the embodiment is composed by replacing the infrared rays emitting section 16 included in the wireless game pad 51 as shown in FIG. 6, with a radio waves transmitting section 106. Further, a processing unit 151 is composed by replacing the infrared rays receiving section 22 included in the processing unit 61 as shown in FIG. 6, with a radio waves receiving section 112. Furthermore, FIG. 11 schematically shows a configuration relating to a wireless tablet 161 using a wireless communication channel in which radio waves 100 are used as a medium. The wireless tablet 161 of the embodiment is composed by replacing the infrared rays emitting section 16 included in the wireless tablet 71 as shown in FIG. 7, with a radio waves transmitting section 106. Further, a processing unit 171 is composed by replacing the infrared rays receiving section 22 included in the processing unit 81 as shown in FIG. 7, with a radio waves receiving section 112. Also in the sixth to eighth embodiments as described above, as in the case of the fifth embodiment, by using the radio waves 100 as a medium, it is possible to transmit details of an operation of the wireless mouse 121, the wireless game pad 141, or the wireless tablet 161, which serve as an entry unit, to the processing units 131, 151, 171 by wireless.

Figure 12:
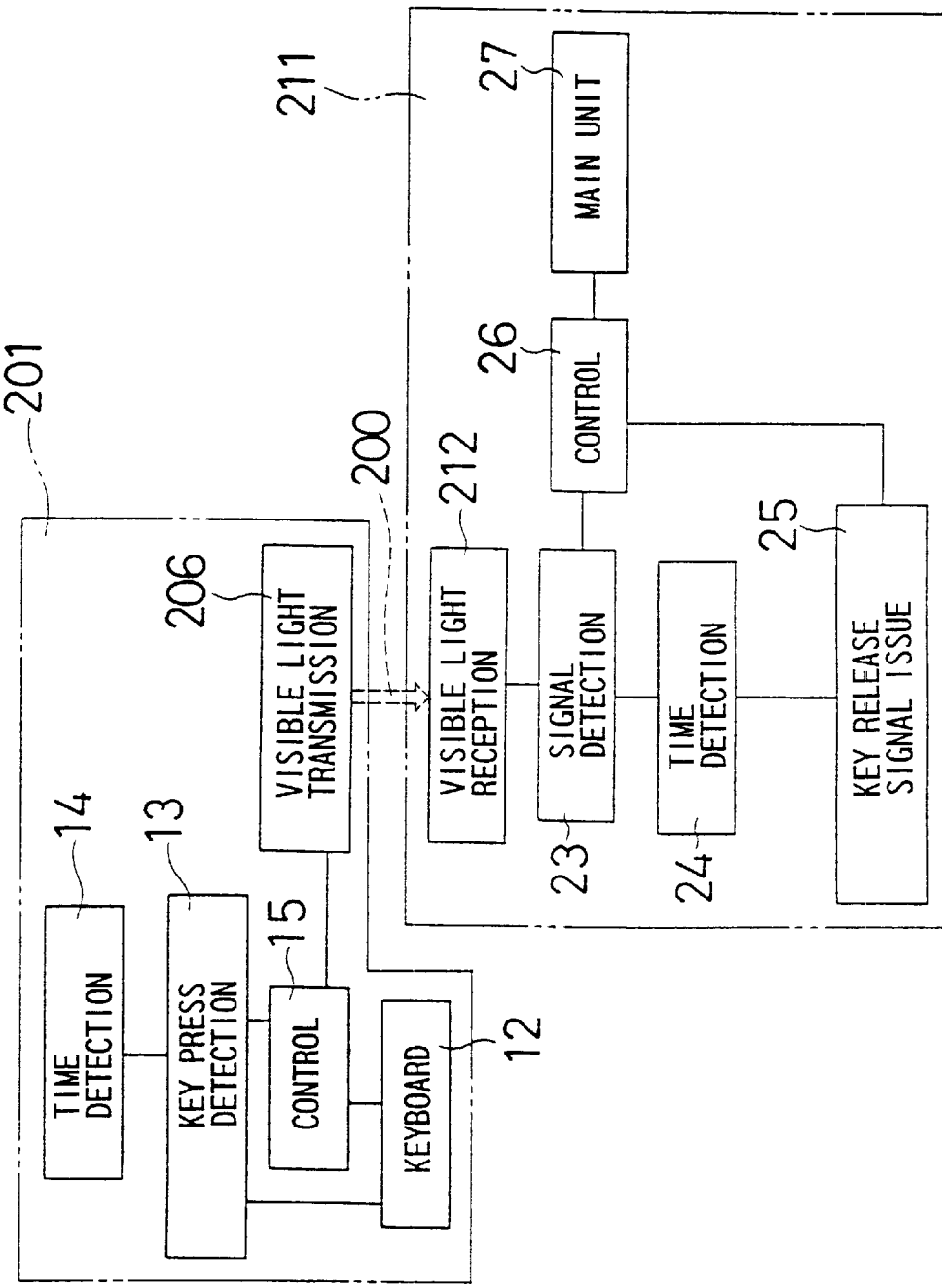
FIG. 12 is a schematic block diagram showing an electrical configuration relating to a wireless keyboard 201 as a ninth embodiment of the invention.
Figure 13:
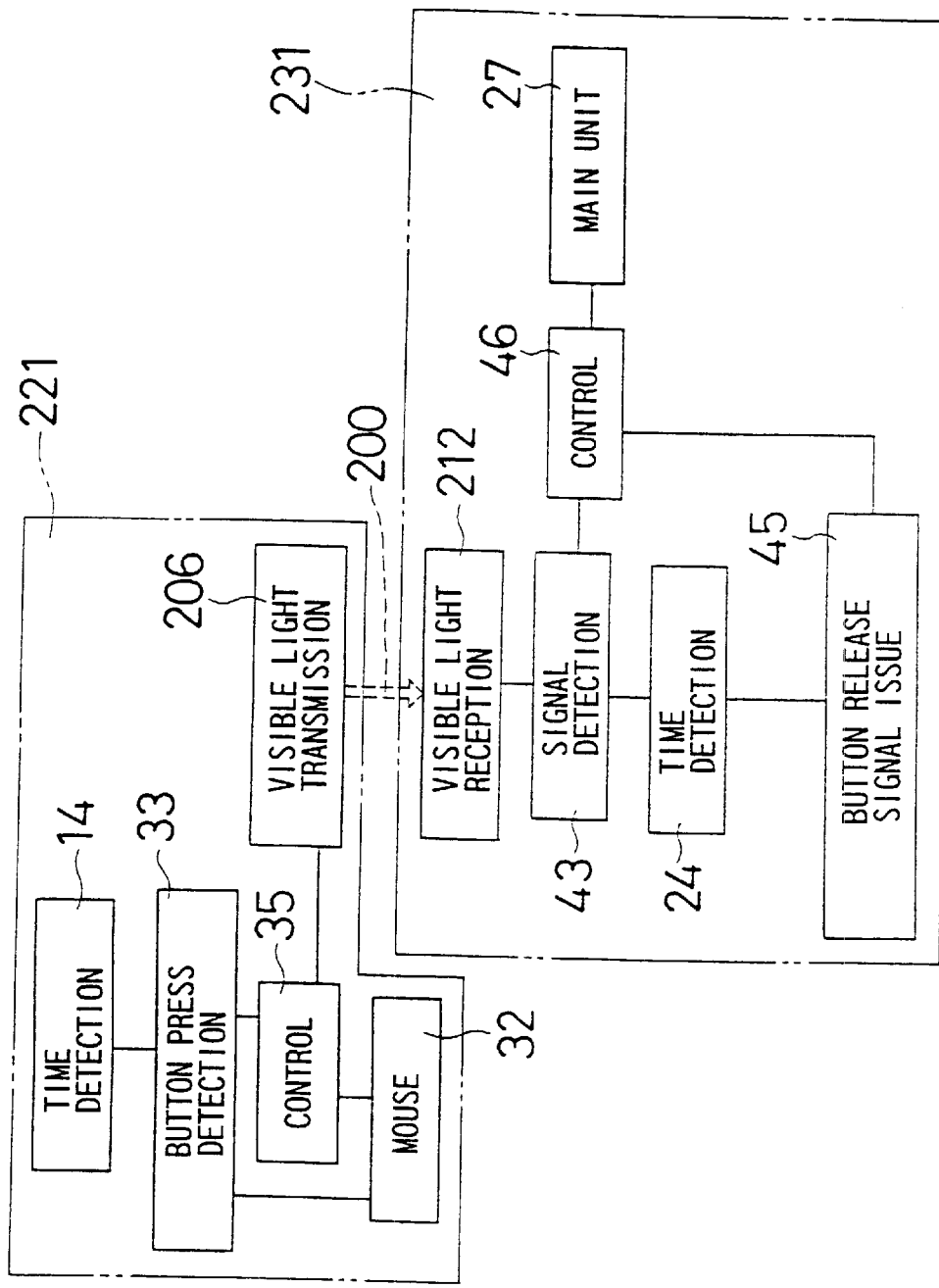
FIG. 13 is a schematic block diagram showing an electrical configuration relating to a wireless mouse 221 as a tenth embodiment of the invention.
Figure 14:
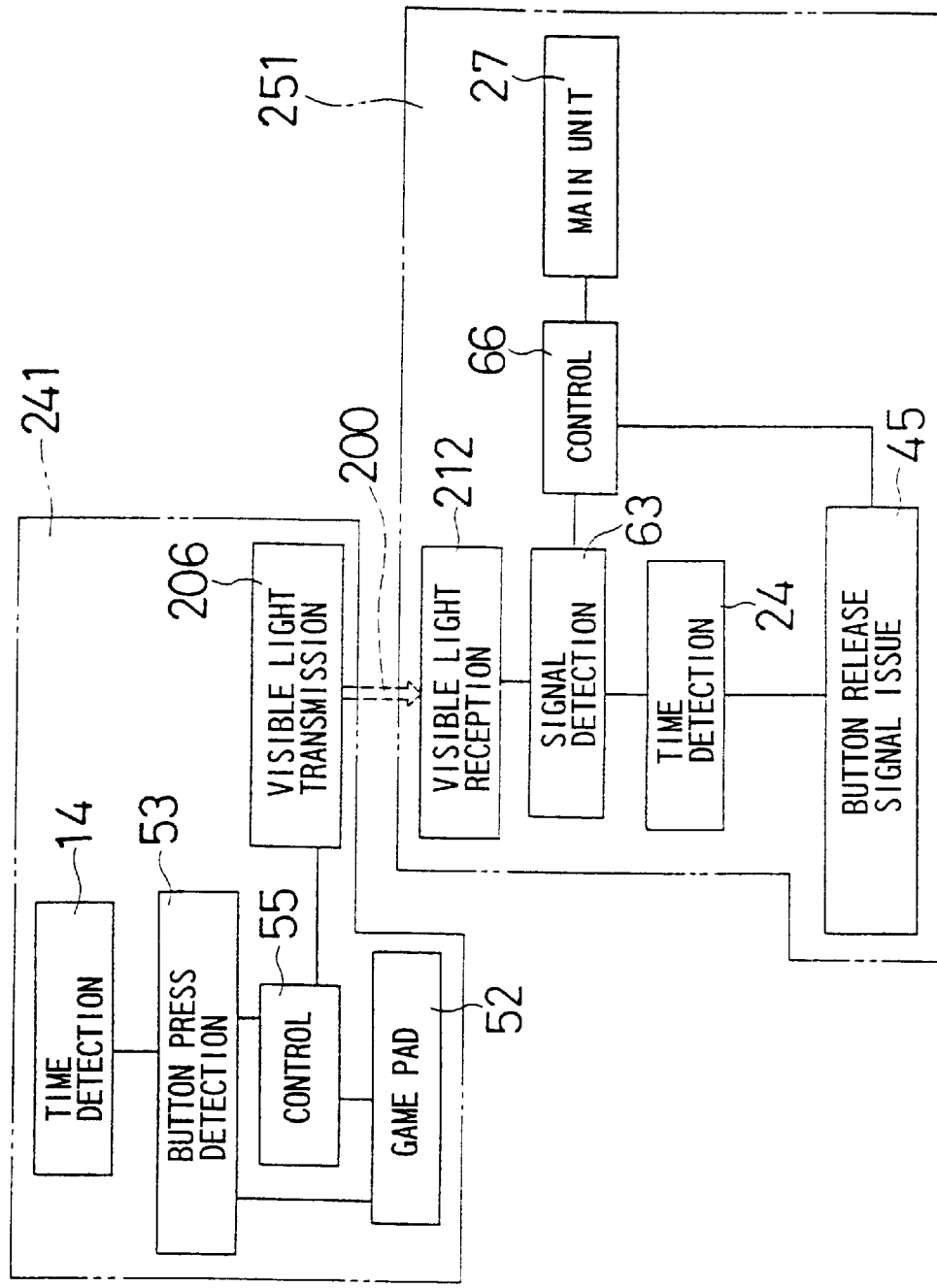
FIG. 14 is a schematic block diagram showing an electrical configuration relating to a wireless game pad 241 as an eleventh embodiment of the invention.
Figure 15:
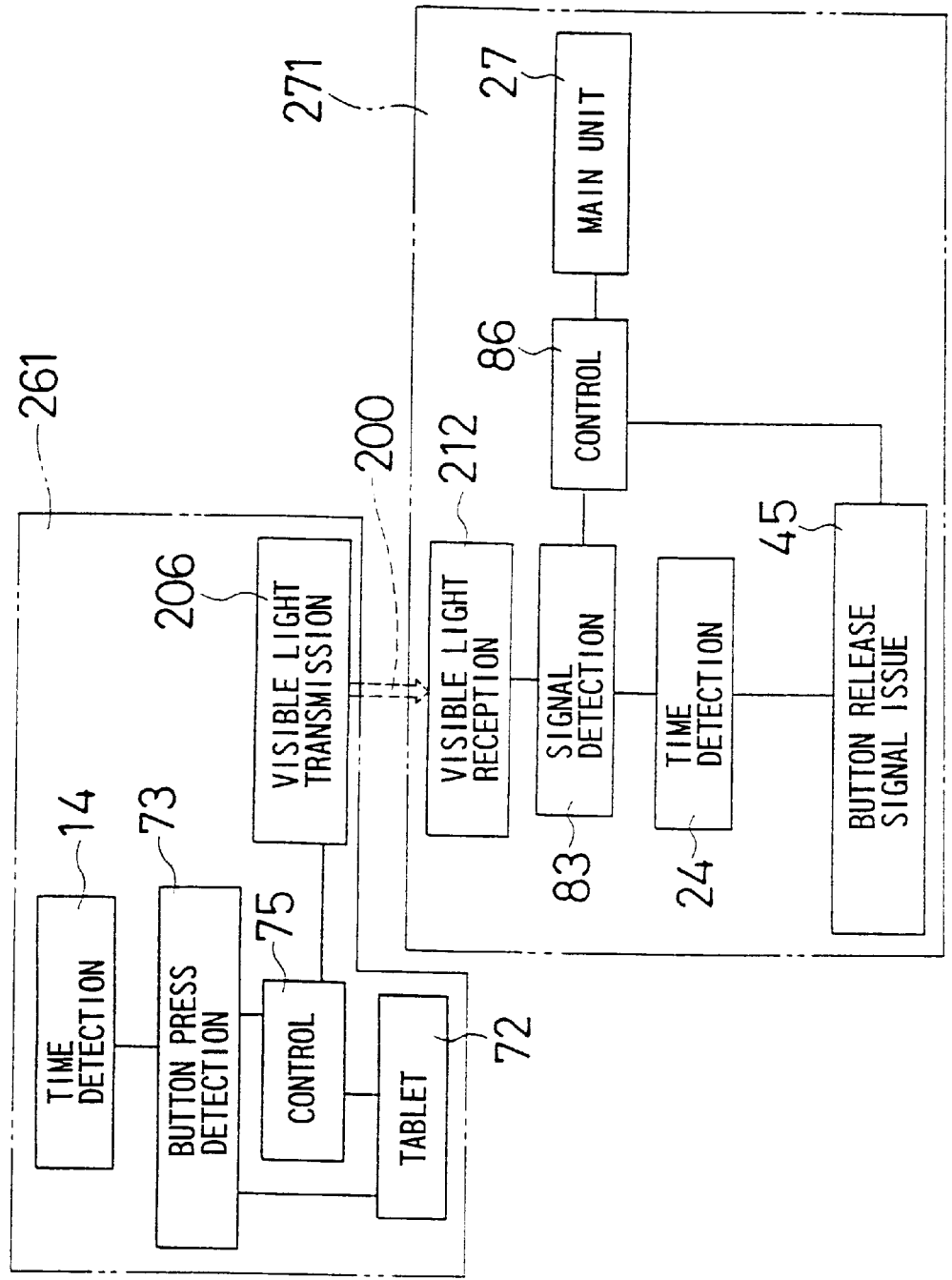
FIG. 15 is a schematic block diagram showing an electrical configuration relating to a wireless tablet 261 as a twelfth embodiment of the invention.

FIG. 12 schematically shows an electrical configuration relating to a wireless keyboard 201 in which a wireless communication channel is formed with visible light 200 used as a medium, as a ninth embodiment of the invention. The wireless keyboard 201 is composed by replacing the infrared rays emitting section 16 included in the wireless keyboard 11 as shown in FIG. 1, with a visible light transmitting section 206. A processing unit 211 which processes a signal of visible light from the visible light transmitting section 206 is composed by replacing the infrared rays receiving section 22 included in the processing unit 21 as shown in FIG. 1, with a visible light receiving section 212. Furthermore, FIG. 13 schematically shows an electrical configuration relating to a wireless mouse 221 and a processing unit 231, as a tenth embodiment to transmit details of an operation via a wireless communication channel using visible light 200 as a medium. FIG. 14 schematically shows an electrical configuration relating to a wireless game pad 241 and a processing unit 251, as an eleventh embodiment in which visible light 200 is used as a medium of a wireless communication channel. FIG. 15 schematically shows an electrical configuration relating to a wireless tablet 261 and a processing unit 271, as a twelfth embodiment in which visible light 200 is used as a medium of a wireless communication channel. In the wireless mouse 221, the wireless game pad 241, and the wireless tablet 261 as shown in FIGS. 13, 14, 15, the infrared rays emitting section 16 shown in FIGS. 6, 7, 8 is replaced with the visible light transmitting section 206. In the processing unit 231, 251, 271 as shown in FIGS. 13, 14, 15, the infrared rays receiving section 22 shown in FIGS. 6, 7, 8 is replaced with the visible light receiving section 212.

In the ninth to twelfth embodiments as shown in FIGS. 12 to 15, a wireless communication channel is formed with the visible light 200 used as a medium, so that it is possible to visually check the visible light 200 serving as a medium, for example, when it is dark. Therefore, it is also possible to check whether or not the visible light 200 surely reaches the visible light receiving section 212 from the visible light transmitting section 206 and thereby the wireless communication channel is formed. However, the wireless keyboard 201, the wireless mouse 221, the wireless game pad 241, and the wireless tablet 261, which serve as an entry unit, are sometimes greatly moved unintentionally, and in such a case, the wireless communication channel formed by the visible light 200 might be interrupted. In the embodiments, even when the wireless communication channel formed by the visible light 200 is interrupted during operation to the entry unit, it is possible to avoid false recognition that the input operation is continued.

Figure 16:
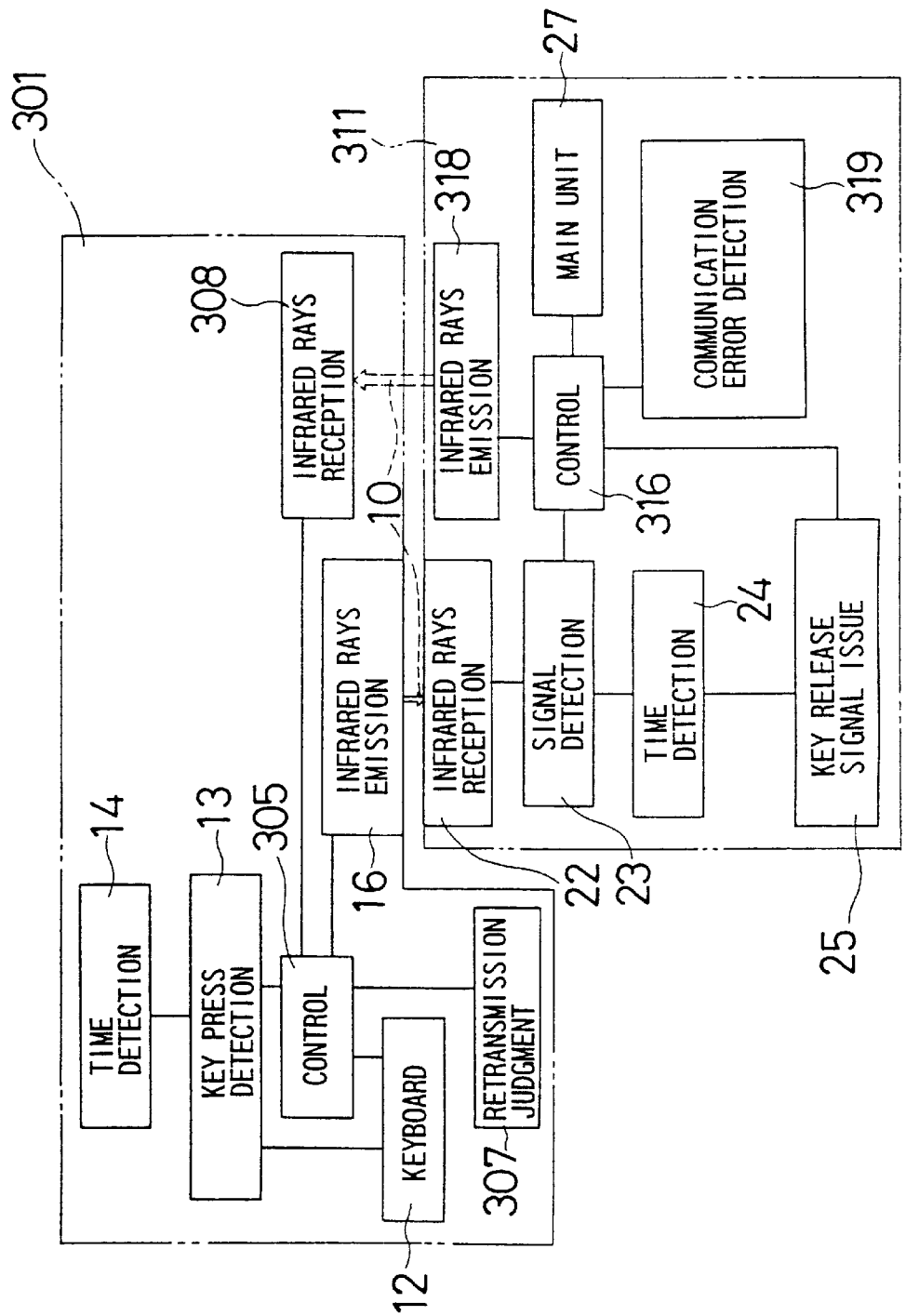
FIG. 16 is a schematic block diagram showing an electrical configuration relating to a wireless keyboard 301 as a thirteenth embodiment of the invention.

FIG. 16 schematically shows an electrical configuration of a thirteenth embodiment of the invention. In a wireless keyboard 301 of the embodiment, infrared rays 10 are used as a medium, an operation signal which represents details of an operation of a keyboard 12 is generated by a control section 305, and the signal is transmitted via an infrared rays emitting section 16. The wireless keyboard 301 also includes a retransmission judging section 307 and an infrared rays receiving section 308, whereby it is judged whether the signal transmitted by using the infrared rays 10 as a medium is normally received or not, and the control section 305 controls so as to transmit the signal again when the signal is not normally received. A control section 316 included in a processing unit 311 also transmits information to the wireless keyboard 301 via an infrared rays emitting section 318 by using the infrared rays 10 as a medium. When any communication error occurs, a communication error detecting section 319 detects the error, and transmits it to the wireless keyboard 301 that a signal from the infrared rays emitting section 318 is not normally received. When the processing unit 311 does not normally receive a signal, the wireless keyboard 301 transmits the signal again.

In the embodiment, both the wireless keyboard 301 and the processing unit 311 include both the infrared rays receiving section 22, 308 and the infrared rays emitting section 16, 318, judge whether or not information transmitted from the wireless keyboard 301 or the processing unit 311 is normally transmitted to the other, and retransmit the information when required in the case where the information is not normally transmitted, whereby transmission of a signal and information can be performed with reliability.

Figure 17:
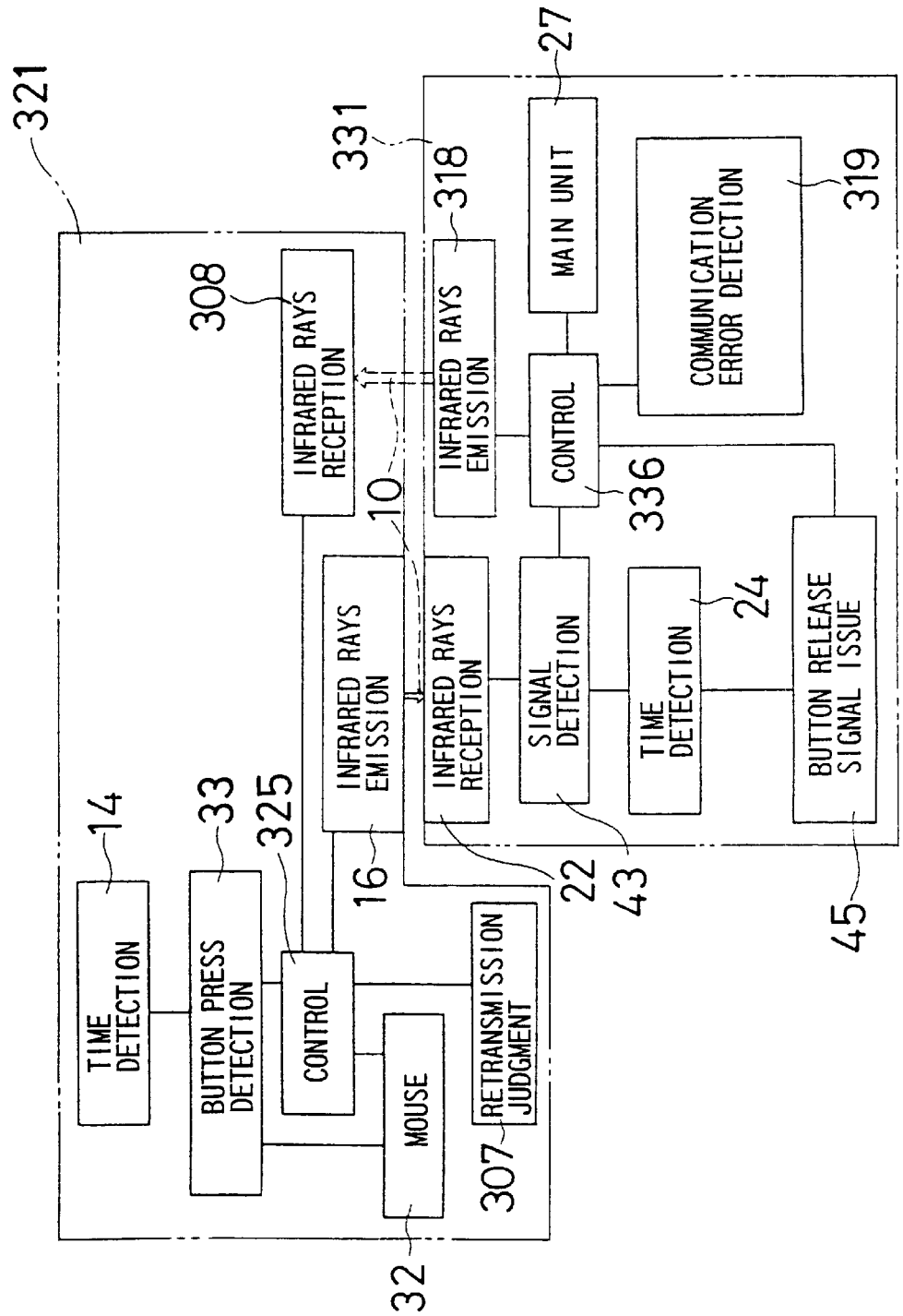
FIG. 17 is a schematic block diagram showing an electrical configuration relating to a wireless mouse 321 as a fourteenth embodiment of the invention.
Figure 18:
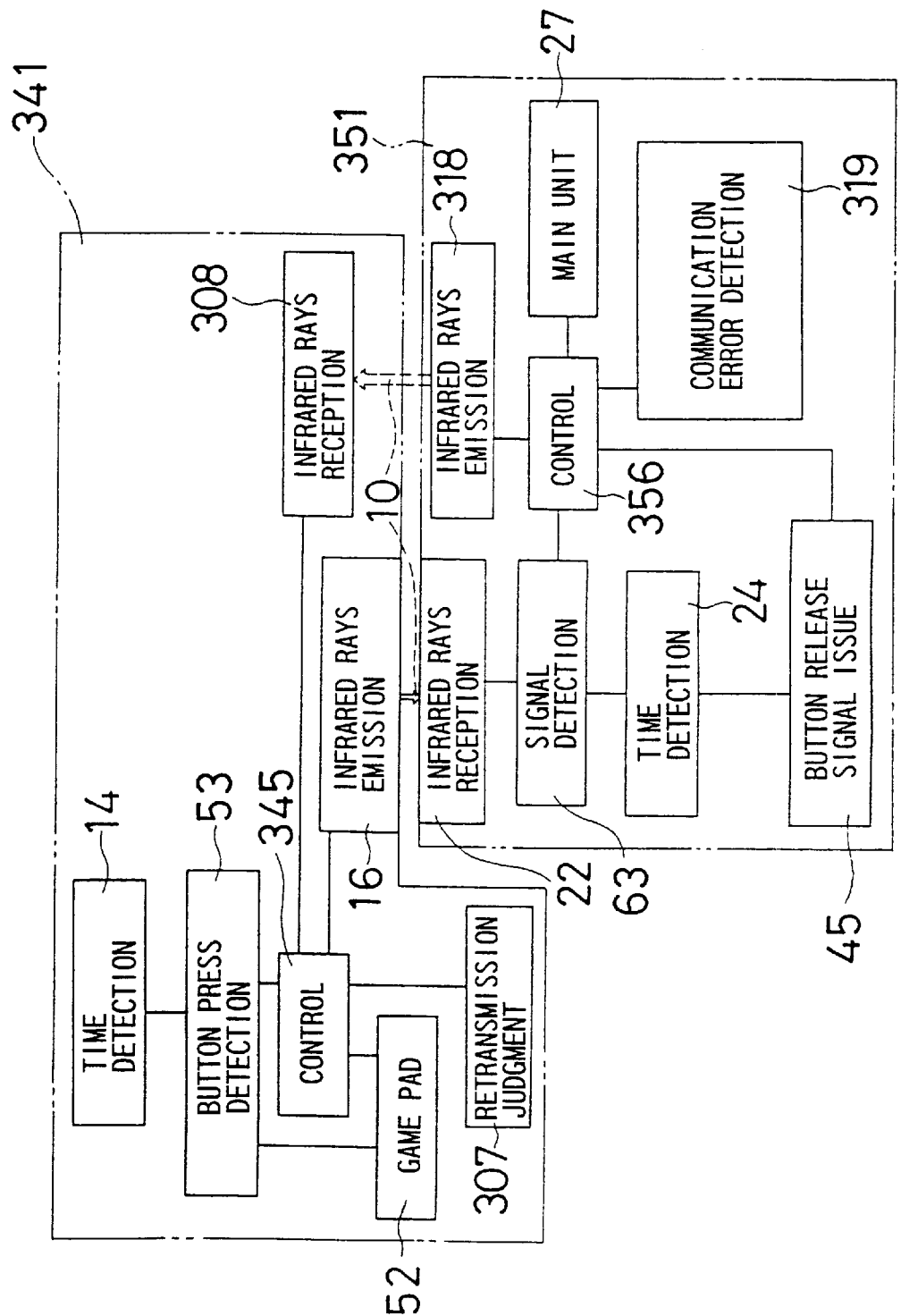
FIG. 18 is a schematic block diagram showing an electrical configuration relating to a wireless game pad 341 as a fifteenth embodiment of the invention.
Figure 19:
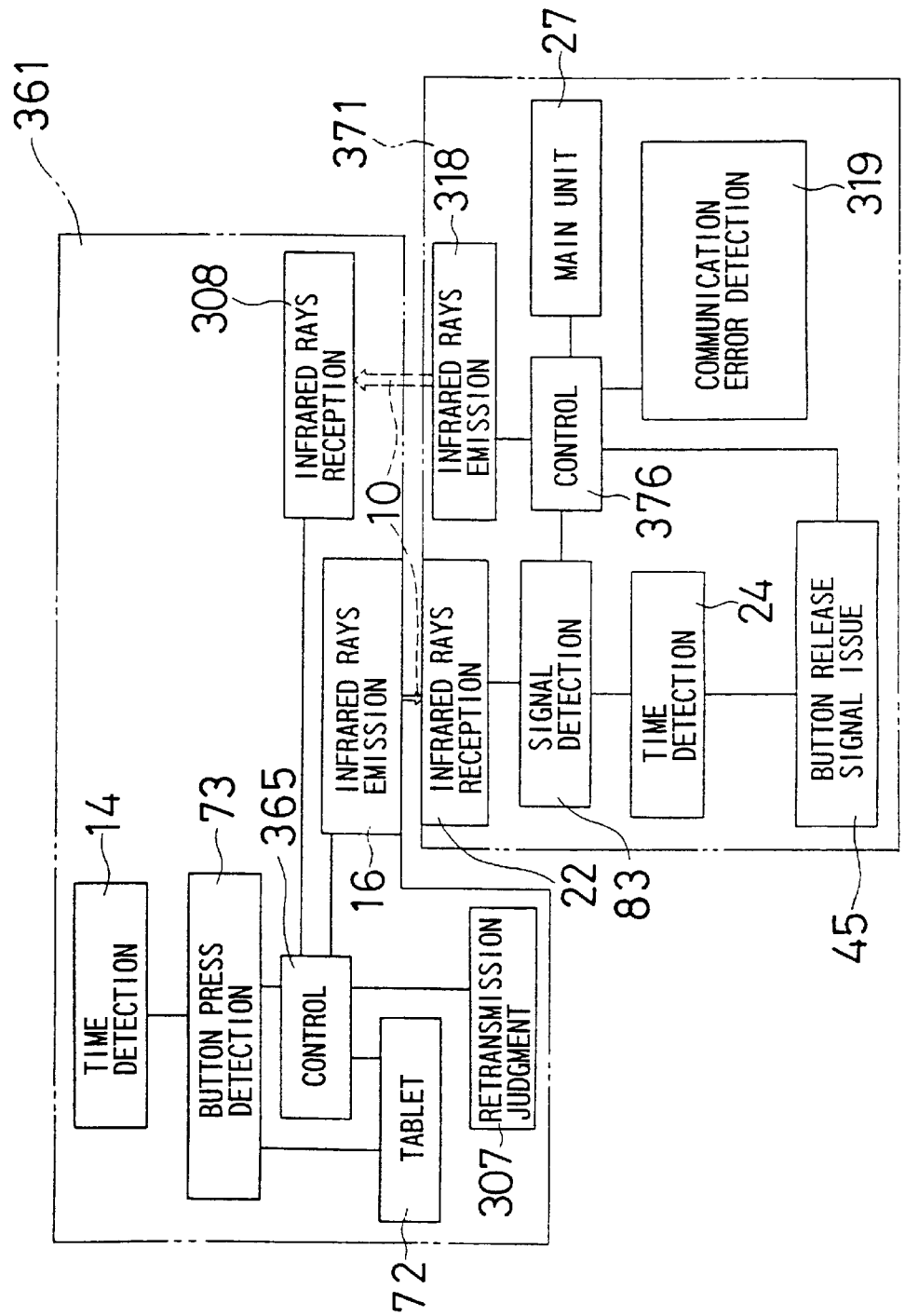
FIG. 19 is a schematic block diagram showing an electrical configuration relating to a wireless tablet 361 as a sixteenth embodiment of the invention.

FIGS. 17, 18, 19 schematically show electrical configurations of fourteenth, fifteenth and sixteenth embodiments of the invention, respectively. In the fourteenth embodiment as shown in FIG. 17, control for bidirectional transmission of a signal and information is executed between a control section 325 of a wireless mouse 321 and a control section 336 of a processing unit 331, by using infrared rays 10 as a medium of a wireless communication channel. In the fifteenth embodiment as shown in FIG. 18, between a control section 345 of a wireless game pad 341 and a control section 356 of a processing unit 351, control for bidirectional transmission of a signal and information is executed via a communication channel using infrared rays 10. In the sixteenth embodiment as shown in FIG. 19, between a control section 365 of a wireless tablet 361 and a control section 376 of a processing unit 371, control is executed for bidirectional wireless communication using infrared rays 10 as a medium. By bidirectional wireless communication using the infrared rays 10 as a medium, it is possible to transmit a signal and information with reliability as in the case of the thirteenth embodiment.

Figure 20:
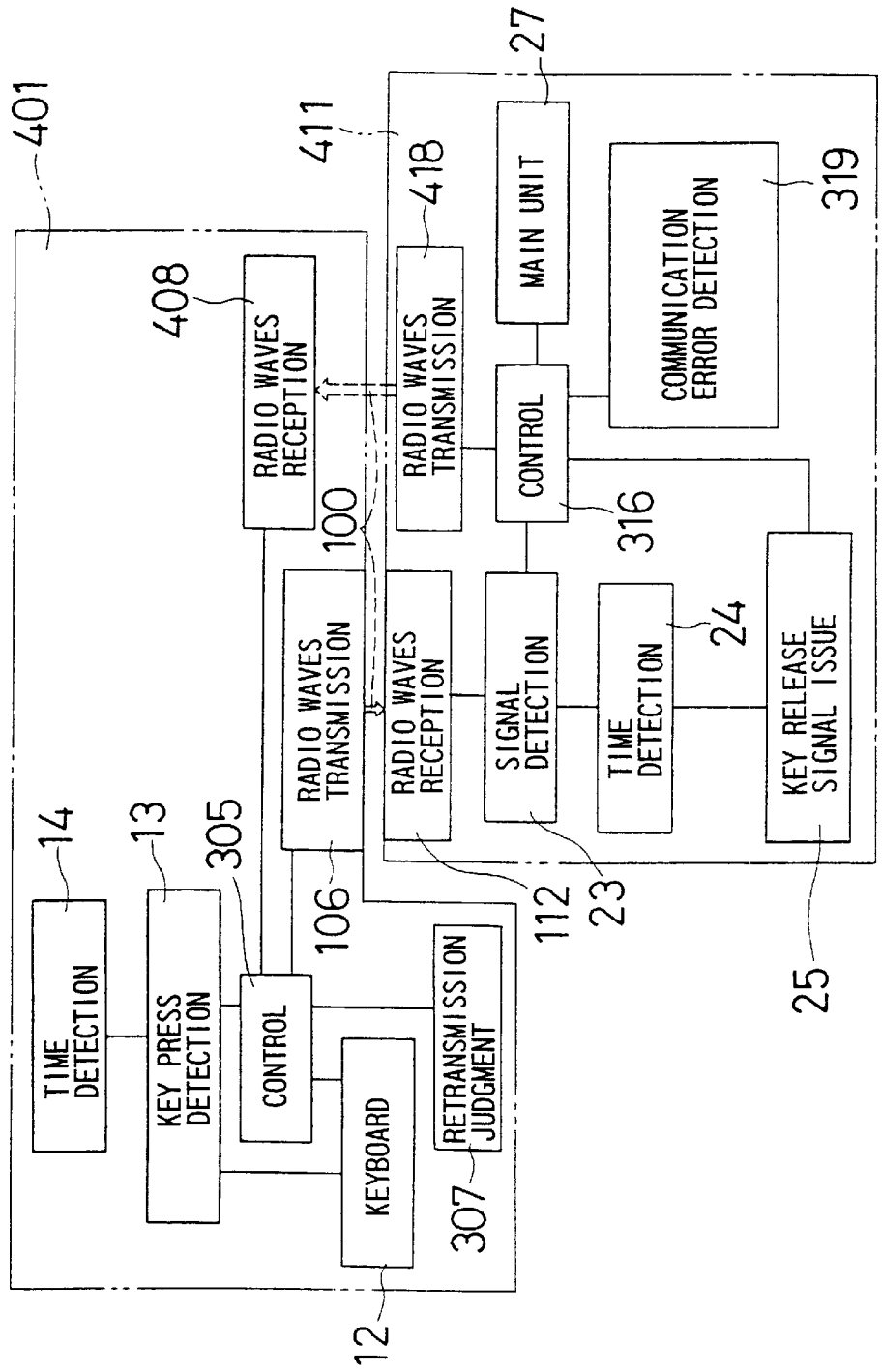
FIG. 20 is a schematic block diagram showing an electrical configuration relating to a wireless keyboard 401 as a seventeenth embodiment of the invention.

FIG. 20 schematically shows, as a seventeenth embodiment of the invention, an electrical configuration to transmit and receive information concerning an input operation of a keyboard 12 between a wireless keyboard 401 and a processing unit 411, by bidirectional wireless communication using radio waves 100 as a medium. In the embodiment, the wireless keyboard 401 is composed by replacing the infrared rays emitting section 16 and the infrared rays receiving section 308 included in the wireless keyboard 301 of the thirteenth embodiment as shown in FIG. 16, with a radio raves transmitting section 106 and a radio raves receiving section 408, respectively. Further, the processing unit 411 is composed by replacing the infrared rays receiving section 22 and the infrared rays emitting section 318 included in the processing unit 111 as shown in FIG. 16, with a radio waves receiving section 112 and a radio waves transmitting section 418, respectively. Also in the embodiment, bidirectional communication of a signal and information is performed with the radio waves 100 used as a medium, and the signal and the information are retransmitted when a communication error is detected, whereby communication is ensured.

Figure 21:
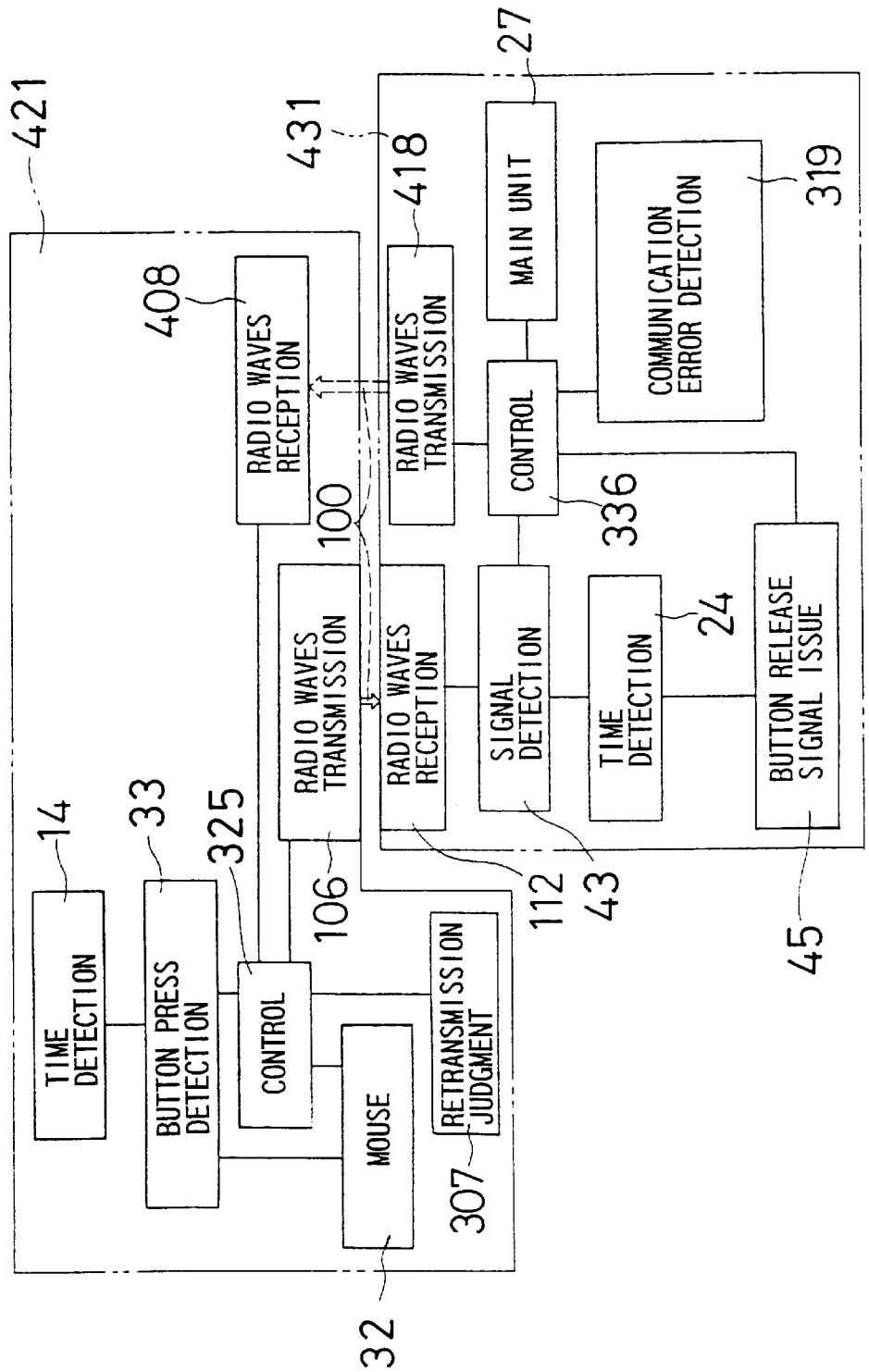
FIG. 21 is a schematic block diagram showing an electrical configuration relating to a wireless mouse 421 as an eighteenth embodiment of the invention.
Figure 22:
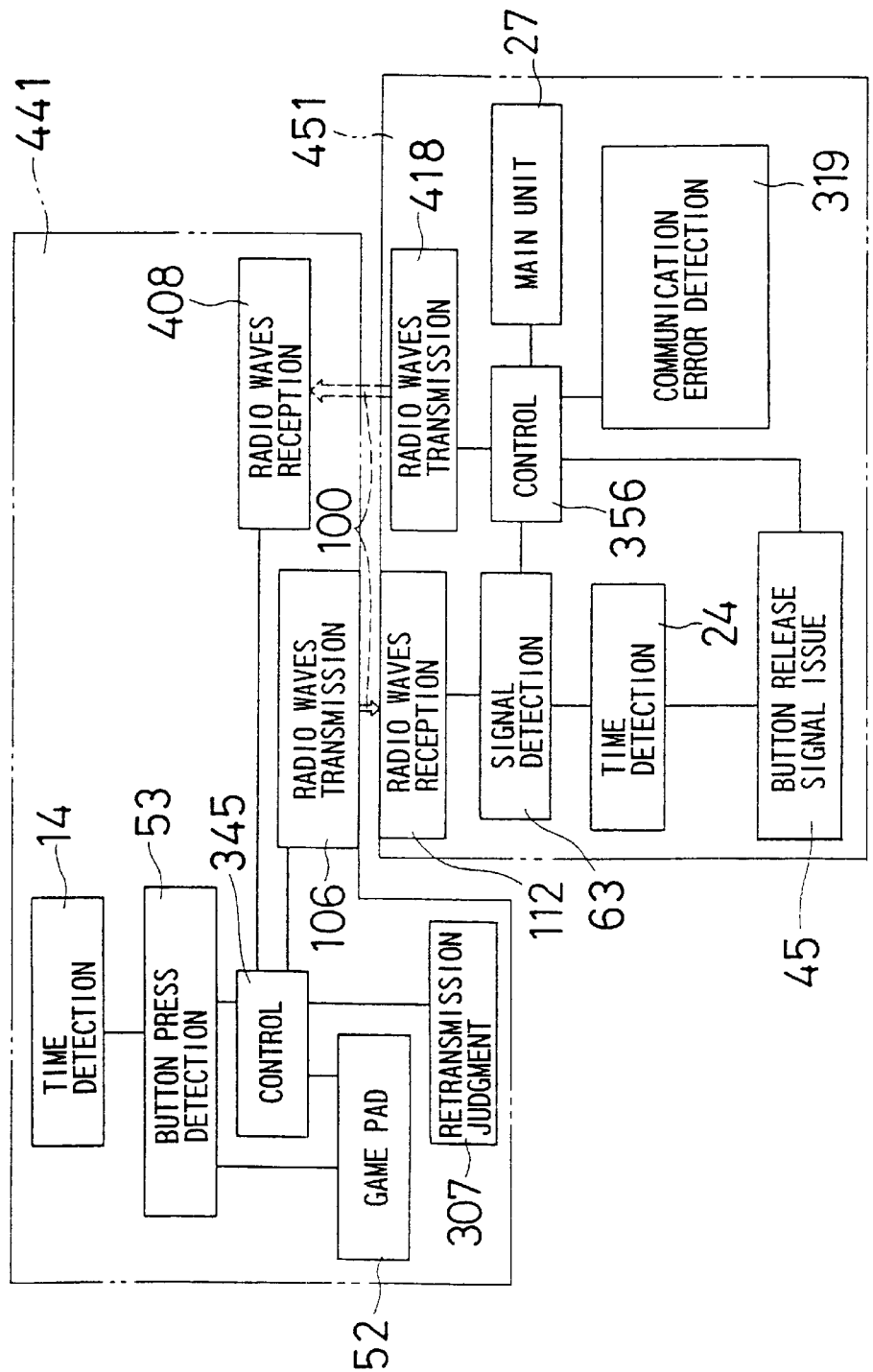
FIG. 22 is a schematic block diagram showing an electrical configuration relating to a wireless game pad 441 as a nineteenth embodiment of the invention.
Figure 23:
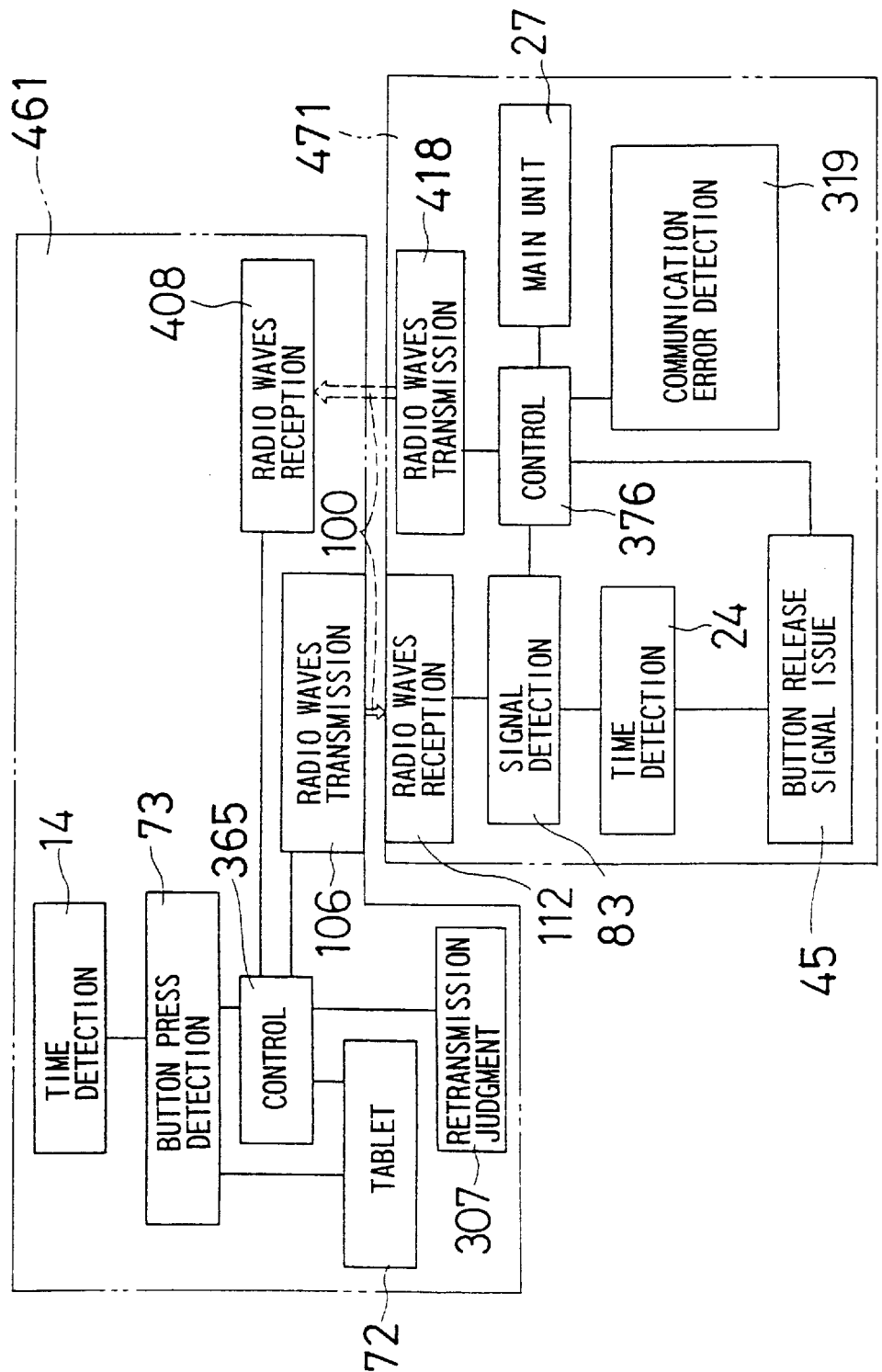
FIG. 23 is a schematic block diagram showing an electrical configuration relating to a wireless tablet 461 as a twentieth embodiment of the invention.

FIGS. 21, 22, 23 schematically show electrical configurations of eighteenth, nineteenth and twentieth embodiments in which radio waves 100 are used as a medium of a wireless communication channel, respectively. A wireless mouse 421 of the eighteenth embodiment as shown in FIG. 21 is composed by replacing the infrared rays emitting section 16 and the infrared rays receiving section 308 included in the wireless mouse 321 of the fourteenth embodiment as shown in FIG. 17, with a radio waves transmitting section 106 and a radio waves receiving section 408, respectively. A processing unit 421 is composed by replacing the infrared rays receiving section 22 and the infrared rays emitting section 318 included in the processing unit 321 as shown in FIG. 17, with a radio waves receiving section 112 and a radio waves transmitting section 418, respectively. A wireless game pad 441 and a processing unit 451 of the nineteenth embodiment as shown in FIG. 22, and a wireless tablet 461 and a processing unit 471 of the twentieth embodiment as shown in FIG. 23 are also composed by installing the components mentioned above in place of the corresponding components included in the fifteenth embodiment as shown in FIG. 18 and the sixteenth embodiment as shown in FIG. 19. Also in the eighteenth to twentieth embodiments, as in the case of the seventeenth embodiment, by bidirectional communication of a signal and information with the radio waves 100 used as a medium, when a signal and information are not normally transmitted, it is possible to establish communication so as to ensure transmission by retransmitting the signal and the information, and when communication itself is broken down due to a trouble in a communication channel and so on, the processing units 431, 451, 471 are capable of automatically performing a release process.

Figure 24:
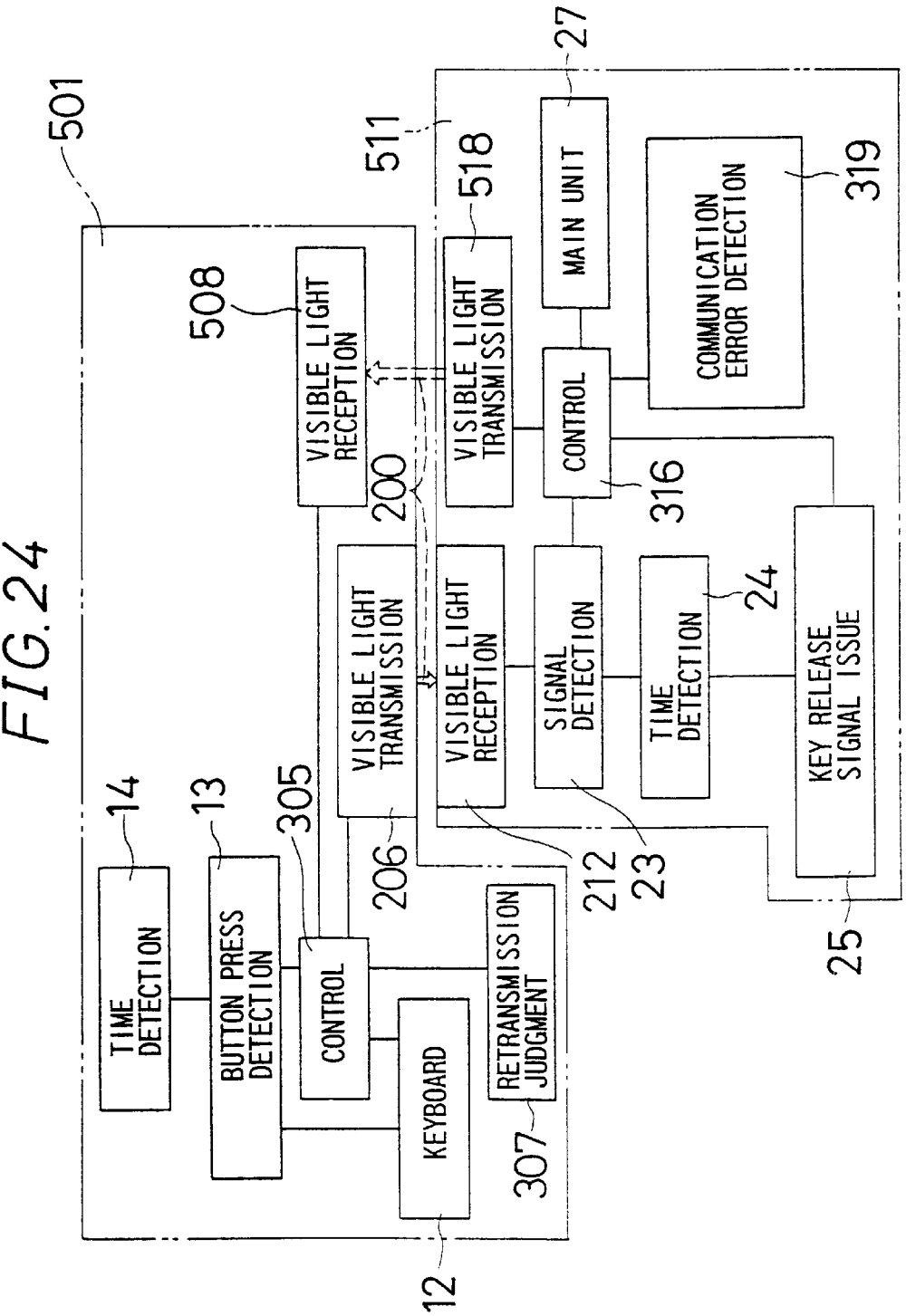
FIG. 24 is a schematic block diagram showing an electrical configuration relating to a wireless keyboard 501 as a twenty-first embodiment of the invention.

FIG. 24 schematically shows, as a twenty-first embodiment of the invention, an electrical configuration of bidirectional communication of a signal and information with visible light 200 used in a wireless communication channel. A wireless keyboard 501 of the embodiment is composed by replacing the infrared rays emitting section 16 and the infrared rays receiving section 308 included in the wireless keyboard 301 of the thirteenth embodiment as shown in FIG. 16, with a visible light transmitting section 206 and a visible light receiving section 508, respectively. Further, a processing unit 511 is composed by replacing the infrared rays receiving section 22 and the infrared rays emitting section 318 included in the processing unit 311 of the thirteenth embodiment as shown in FIG. 16, with a visible light receiving section 212 and a visible light transmitting section 518, respectively. The embodiment features that a wireless communication channel is formed with the visible light 200 used as a medium, as well as the ninth embodiment as shown in FIG. 12. The embodiment also features that a wireless communication is performed bidirectionally, as well as the thirteenth embodiment as shown in FIG. 16.

Figure 25:
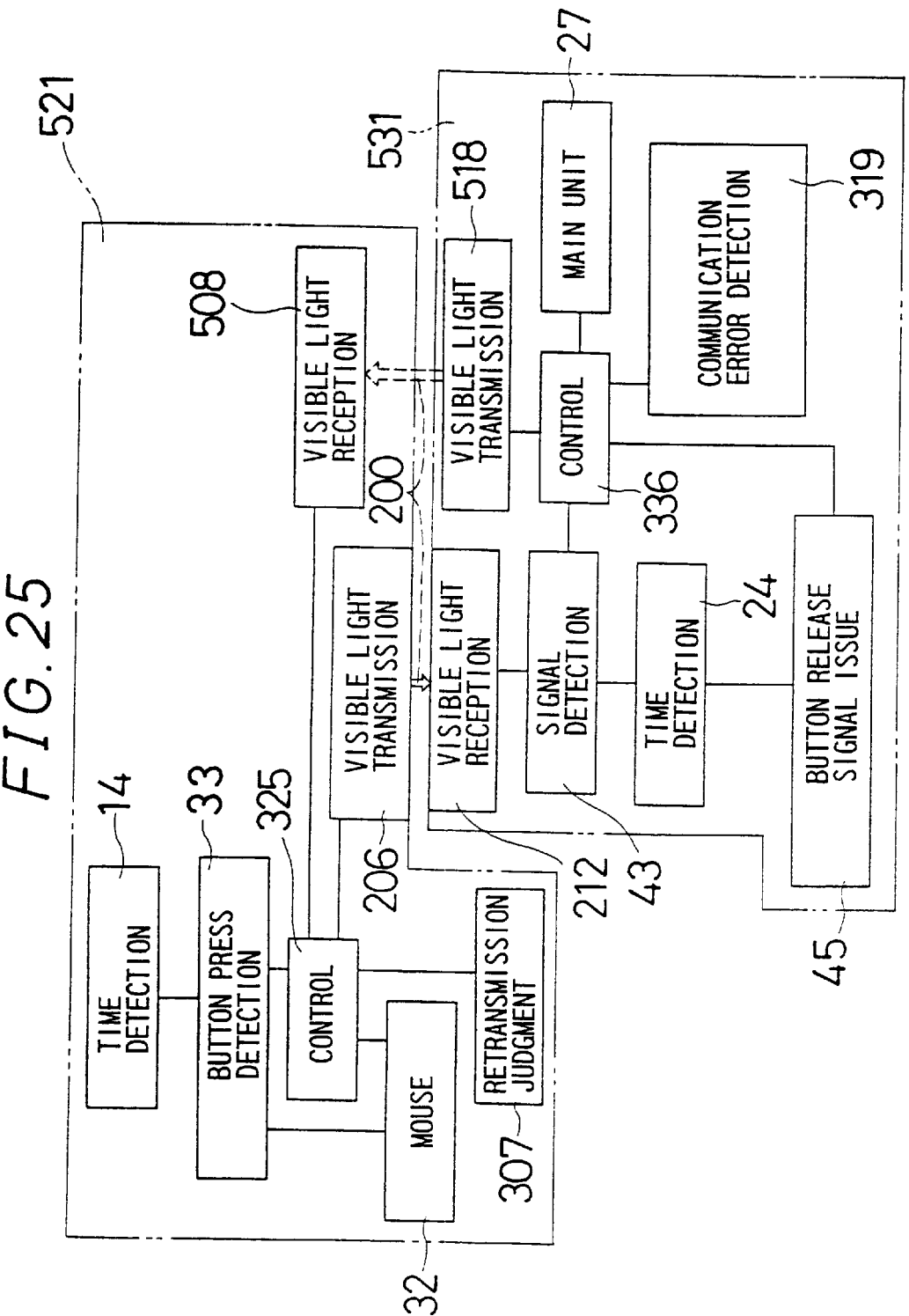
FIG. 25 is a schematic block diagram showing an electrical configuration relating to a wireless mouse 521 as a twenty-second embodiment of the invention.
Figure 26:
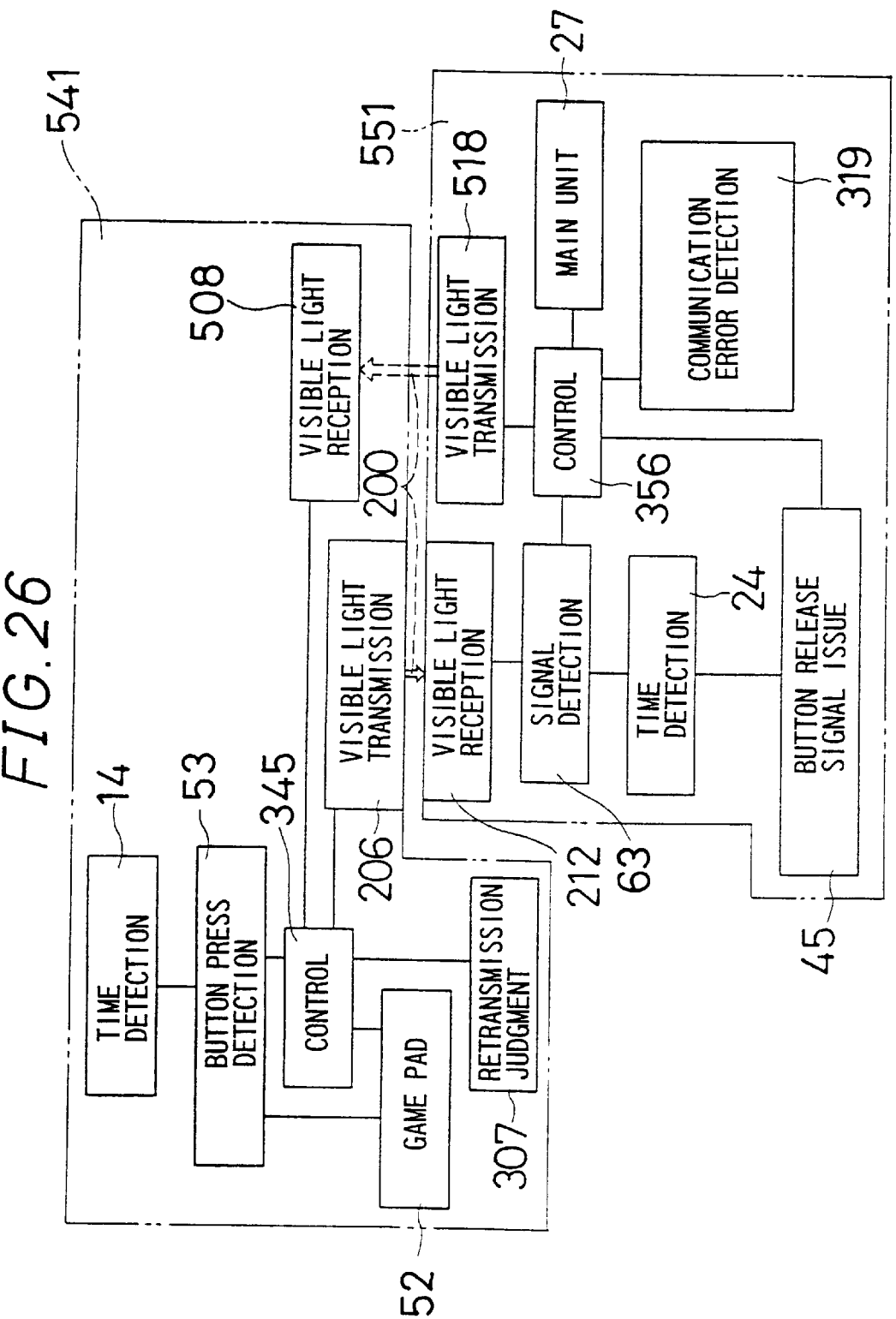
FIG. 26 is a schematic block diagram showing an electrical configuration relating to a wireless game pad 541 as a twenty-third embodiment of the invention.
Figure 27:
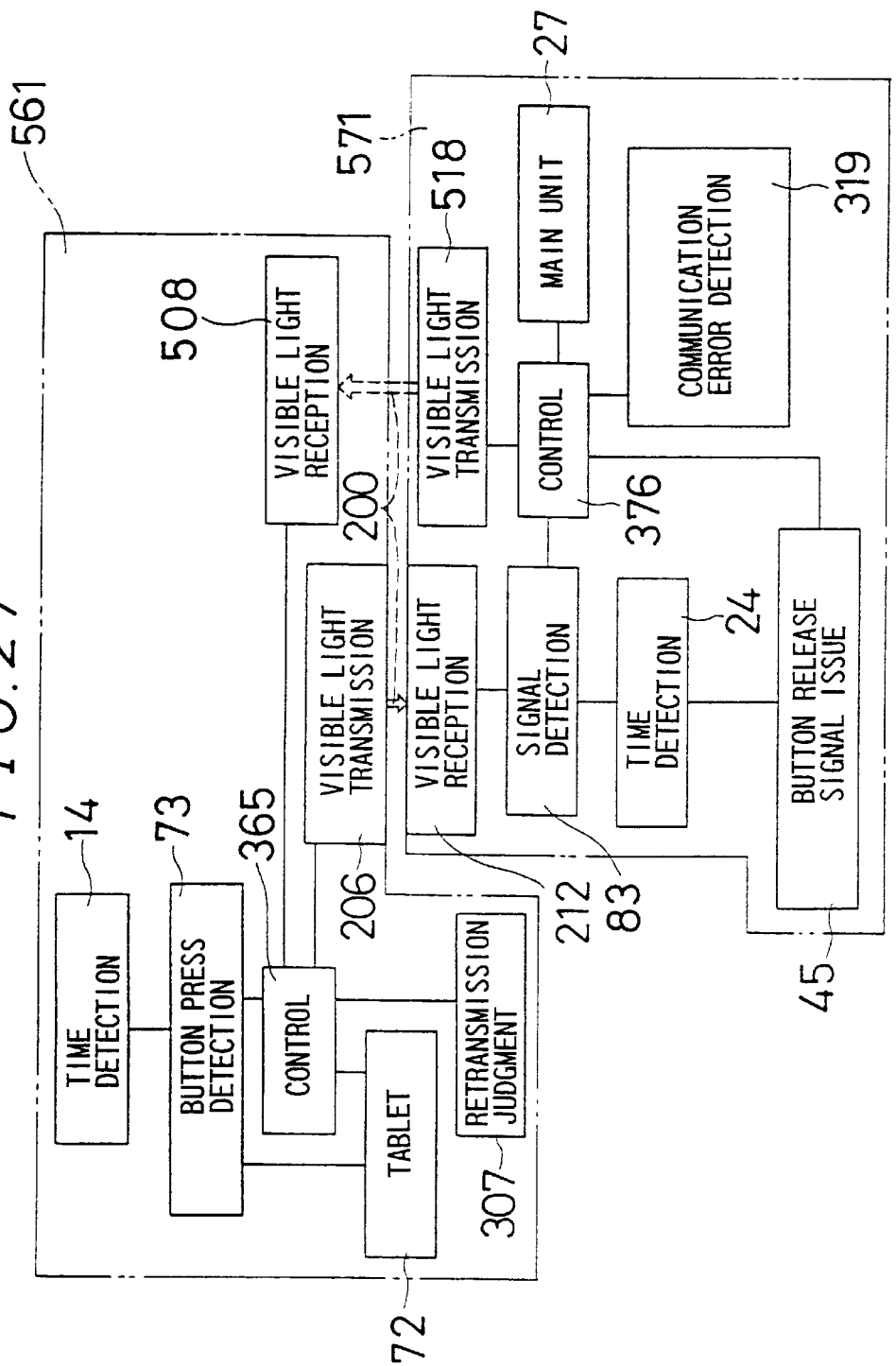
FIG. 27 is a schematic block diagram showing an electrical configuration relating to a wireless tablet 561 as a twenty-fourth embodiment of the invention.
Figure 28:
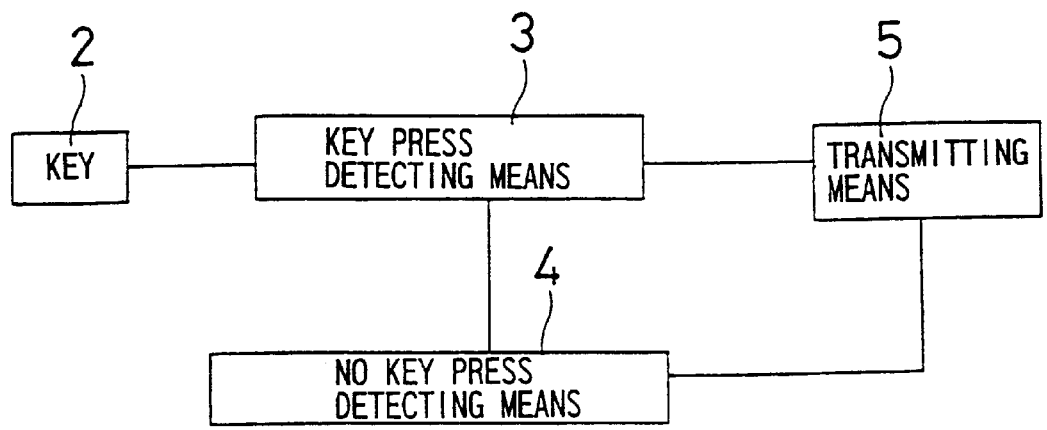
FIG. 28 is a schematic block diagram showing an electrical configuration of a conventional wireless keyboard.
Figure 29:
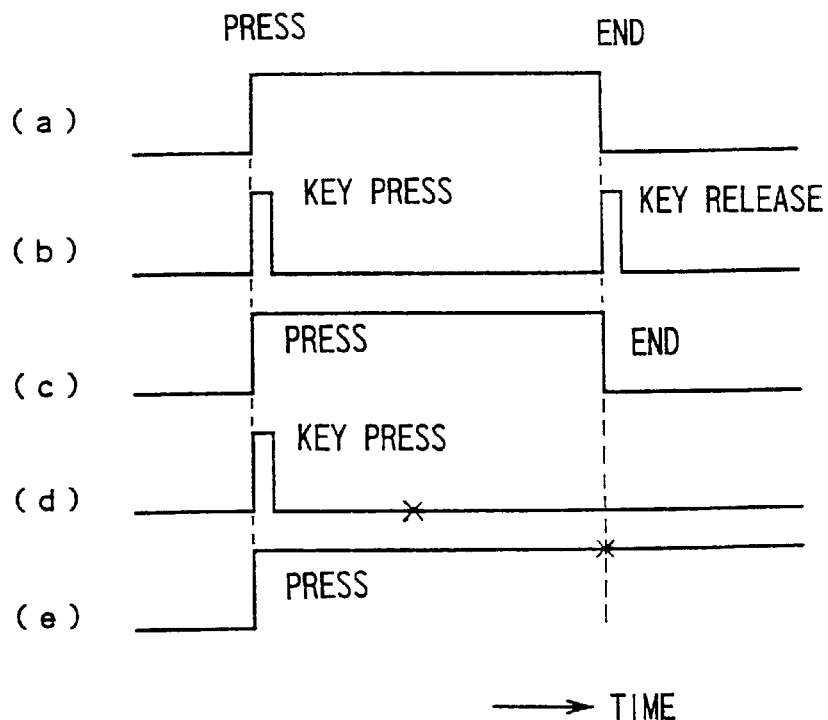
FIGS. 29 (a)–29(e) are time charts showing a key operation to the wireless keyboard as shown in FIG. 28 and a recognition status in a host apparatus.

As twenty-second, twenty-third and twenty-fourth embodiments of the invention, FIGS. 25, 26, 27 individually show configurations to perform bidirectional wireless communication with visible light 200 used as a medium, for transmission of an operation signal between a wireless mouse 521 and a processing unit 531, transmission of an operation signal between a wireless game pad 541 and a processing unit 551, and transmission of an operation signal between a wireless tablet 561 and a processing unit 571, respectively. Also in the twenty-second to twenty-fourth embodiments, devices are composed by installing visible light transmitting sections 206, 518 and visible light receiving sections 212, 508 in place of the corresponding components in the fourteenth to sixteenth embodiments as shown in FIGS. 17–19, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A wireless input apparatus comprising:
an entry unit for use in input operation; and
a processing unit for performing a process of generating data associated with an operation to the entry unit,
the entry unit and the processing unit being connected to each other via a wireless communication channel,
the entry unit including:
an operation detecting section for detecting a start and end of input operation; and
a signal transmitting section for transmitting an operation signal via the wireless communication channel at a time when the operation detecting section detects a start of input operation and at predetermined intervals from the time of detection of the start of the input operation to a time when the operation detecting section detects an end of the input operation,
the processing unit including;
an end-of-operation judging timer for measuring a threshold time which is set to be longer than the predetermined interval of the signal transmitting section of the entry unit;
a signal receiving section for receiving a signal transmitted from the signal transmitting section of the entry unit via the wireless communication channel; and
a processing section for recognizing an input operation and causing the end-of-operation judging timer to start measuring a threshold time when the signal receiving section receives the operation signal, and when the measurement of the threshold time by the end-of-operation judging timer is ended, recognizing an end of the input operation and generating data in accordance with a recognition result.

2. The wireless input apparatus of claim 1,
wherein the processing unit further includes a repeat-of-operation judging timer which is set for a reference time for considering the input operation as being repeated, in the case where an input operation status still continues after the start of the input operation to the entry unit,
wherein the threshold time of the end-of-operation judging timer is preset to be shorter than the reference time, and
wherein the processing section causes the repeat-of-operation judging timer to start measuring the reference time when the signal receiving section receives a first operation signal, and repeatedly generates data associated with the input operation in the case where the repeat-of-operation judging timer has ended the measurement of the reference time although an end of the input operation is not recognized yet.

3. The wireless input apparatus of claim 1,
wherein the processing unit further includes an information transmitting section for transmitting information to the entry unit via the wireless communication channel, and a processing-side control section for controlling communication of information and signals with the entry unit via the information transmitting section and the signal receiving section,
the entry unit further includes an information receiving section for receiving information from the processing unit via the wireless communication channel, and an entry-side control section for controlling communication of information and signals with the processing unit via the information receiving section and the signal transmitting section, and
the processing-side control section and the entry-side control section control the communication of information and signals according to a predetermined procedure, judge after an end of the communication whether or not the communication was normally performed, and perform the communication again when judging that communication was not normally performed.

4. The wireless input apparatus of claim 1, wherein infrared rays are used as a communication medium in the wireless communication channel.

5. The wireless input apparatus of claim 1, wherein radio waves are used as a communication medium in the wireless communication channel.

6. The wireless input apparatus of claim 1, wherein visible light is used as a communication medium in the wireless communication channel.

7. The wireless input apparatus of claim 1, wherein a keyboard is used as the entry unit.

8. The wireless input apparatus of claim 1, wherein a mouse is used as the entry unit.

9. The wireless input apparatus of claim 1, wherein a game pad is used as the entry unit.

10. The wireless input apparatus of claim 1, wherein a tablet is used as the entry unit.

* * * * *